United States Patent
Otomo et al.

(10) Patent No.: US 10,091,095 B2
(45) Date of Patent: Oct. 2, 2018

(54) SYSTEM, NODE, FAILURE DETERMINING SYSTEM, FAILURE DETERMINING METHOD, AND COMPUTER PRODUCT

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Takahisa Suzuki, Yokohama (JP); Hiromasa Yamauchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 129 days.

(21) Appl. No.: 15/057,476

(22) Filed: Mar. 1, 2016

(65) Prior Publication Data

US 2016/0182359 A1 Jun. 23, 2016

Related U.S. Application Data

(63) Continuation of application No. PCT/JP2013/073543, filed on Sep. 2, 2013.

(51) Int. Cl.
*H04L 12/733* (2013.01)
*H04W 4/70* (2018.01)
(Continued)

(52) U.S. Cl.
CPC ............. *H04L 45/20* (2013.01); *H04L 41/06* (2013.01); *H04L 45/28* (2013.01); *H04W 4/005* (2013.01);
(Continued)

(58) Field of Classification Search
None
See application file for complete search history.

(56) References Cited

U.S. PATENT DOCUMENTS 6,046,978 A * 4/2000 Melnik .................. H04L 45/00
370/221
6,333,932 B1 * 12/2001 Kobayasi .................. H04L 5/16
370/253
(Continued)

FOREIGN PATENT DOCUMENTS

| JP | 2007-183731 | 7/2007 |
| JP | 2012-015706 | 1/2012 |
| JP | 2012-147054 | 8/2012 |

OTHER PUBLICATIONS

Herberg, U., et al., "Depth-First Forwarding in Unreliable Networks (DFF); draft-cardenas-dff-06.txt", Internet Engineering Task Force, IETF; Standard Working Draft, Internet Society (ISOC), Jun. 26, 2012. pp. 1-34, XP015083496.
(Continued)

*Primary Examiner* — Andrew Oh
(74) *Attorney, Agent, or Firm* — Fujitsu Patent Center

(57) ABSTRACT

A system has a group of nodes that perform multi-hop communication therebetween and a communications apparatus that communicates with a node included in the group of nodes. The node adds to data transmitted by the node, a hop count updated each time the data is transferred by the multi-hop communication and a reference hop count for the data to be transferred from the node to the communications apparatus, and transmits the data. The communications apparatus, when receiving the data, compares the reference hop count and the hop count added to the data, and based on a result of comparison, determines whether failure has occurred at a given node in the group of nodes.

10 Claims, 24 Drawing Sheets

(51) Int. Cl.
*H04W 40/22* (2009.01)
*H04W 84/18* (2009.01)
*H04W 24/04* (2009.01)
*H04W 4/00* (2018.01)
*H04L 12/703* (2013.01)
*H04L 12/24* (2006.01)
*H04W 40/34* (2009.01)

(52) U.S. Cl.
CPC ............ *H04W 4/70* (2018.02); *H04W 24/04* (2013.01); *H04W 40/22* (2013.01); *H04W 84/18* (2013.01); H04L 41/0677 (2013.01); H04W 40/34 (2013.01)

(56) References Cited

U.S. PATENT DOCUMENTS

| | | | | |
|---|---|---|---|---|
| 2002/0027495 | A1* | 3/2002 | Darby, Jr. | B61L 3/125 340/298 |
| 2002/0143989 | A1* | 10/2002 | Huitema | H04L 29/12066 709/243 |
| 2003/0142660 | A1* | 7/2003 | Nishimura | H04L 45/122 370/351 |
| 2004/0153520 | A1* | 8/2004 | Rune | H04L 12/4616 709/206 |
| 2004/0156384 | A1* | 8/2004 | Rune | H04W 40/02 370/432 |
| 2005/0206530 | A1* | 9/2005 | Cumming | G01D 4/006 340/870.02 |
| 2006/0245442 | A1 | 11/2006 | Srikrishna et al. | |
| 2007/0280136 | A1* | 12/2007 | Chen | H04L 45/18 370/254 |
| 2011/0032818 | A1 | 2/2011 | Yamaguchi et al. | |
| 2011/0317182 | A1* | 12/2011 | Murayama | G03G 15/5058 358/1.9 |
| 2012/0072894 | A1* | 3/2012 | Wang | G06F 8/656 717/168 |
| 2012/0224469 | A1* | 9/2012 | Erke | H04L 12/14 370/221 |
| 2012/0307752 | A1 | 12/2012 | Hirata et al. | |
| 2013/0258839 | A1* | 10/2013 | Wang | H04L 41/0668 370/221 |
| 2014/0269275 | A1* | 9/2014 | Jun | H04W 36/22 370/230 |
| 2014/0269842 | A1* | 9/2014 | Lacatus | H04B 1/7156 375/134 |

OTHER PUBLICATIONS

EESR—The Extended European Search Report issued for European Patent Application 13892771.0 dated Jul. 11, 2016. **JP2012-015706 cited in the EESR was previously submitted in the IDS filed on Mar. 1, 2016.

International Search Report, mailed in connection with PCT/JP2013/073543 and dated Sep. 11, 2013 (1 page).

TWOA Office Action of Patent Application 103119501 dated Jan. 14, 2016, partial English translation (14 pages).

* cited by examiner

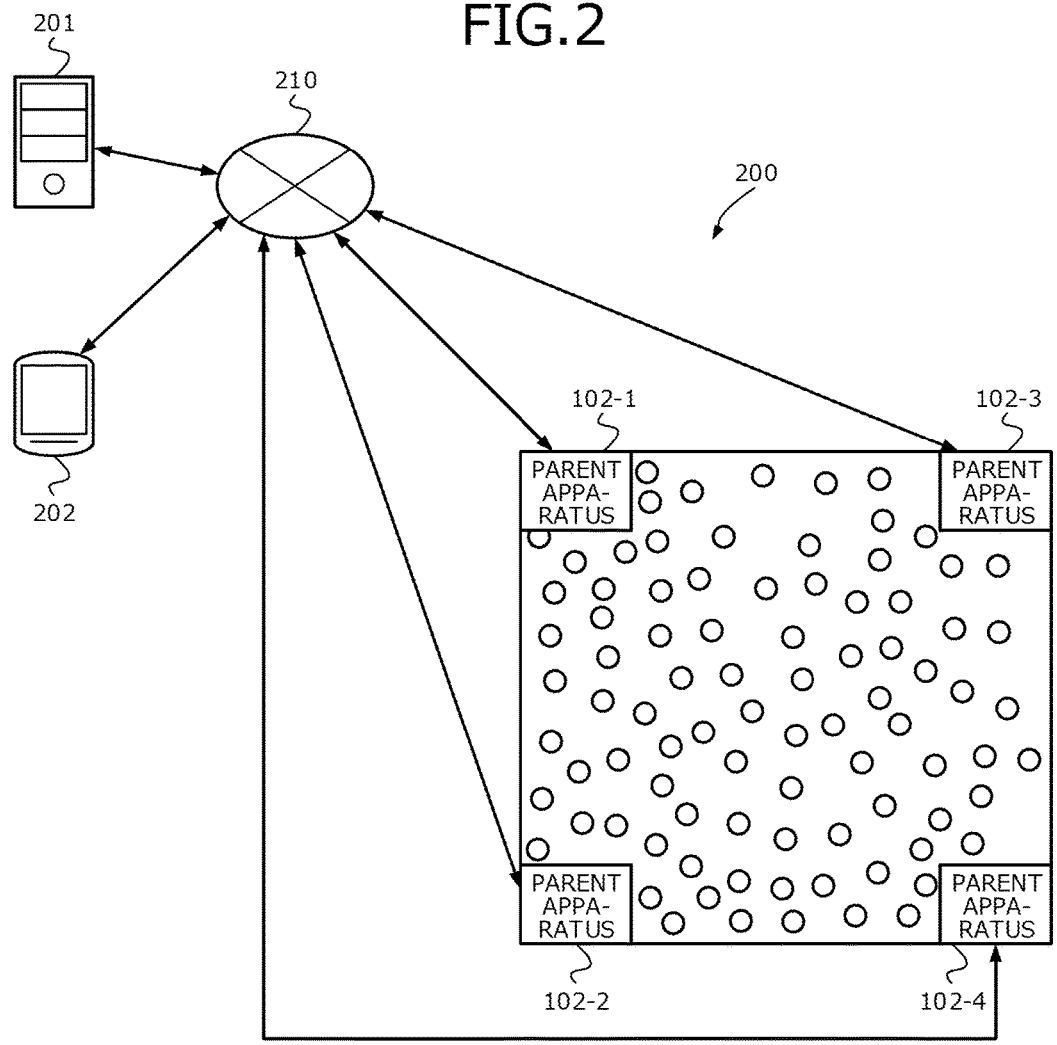

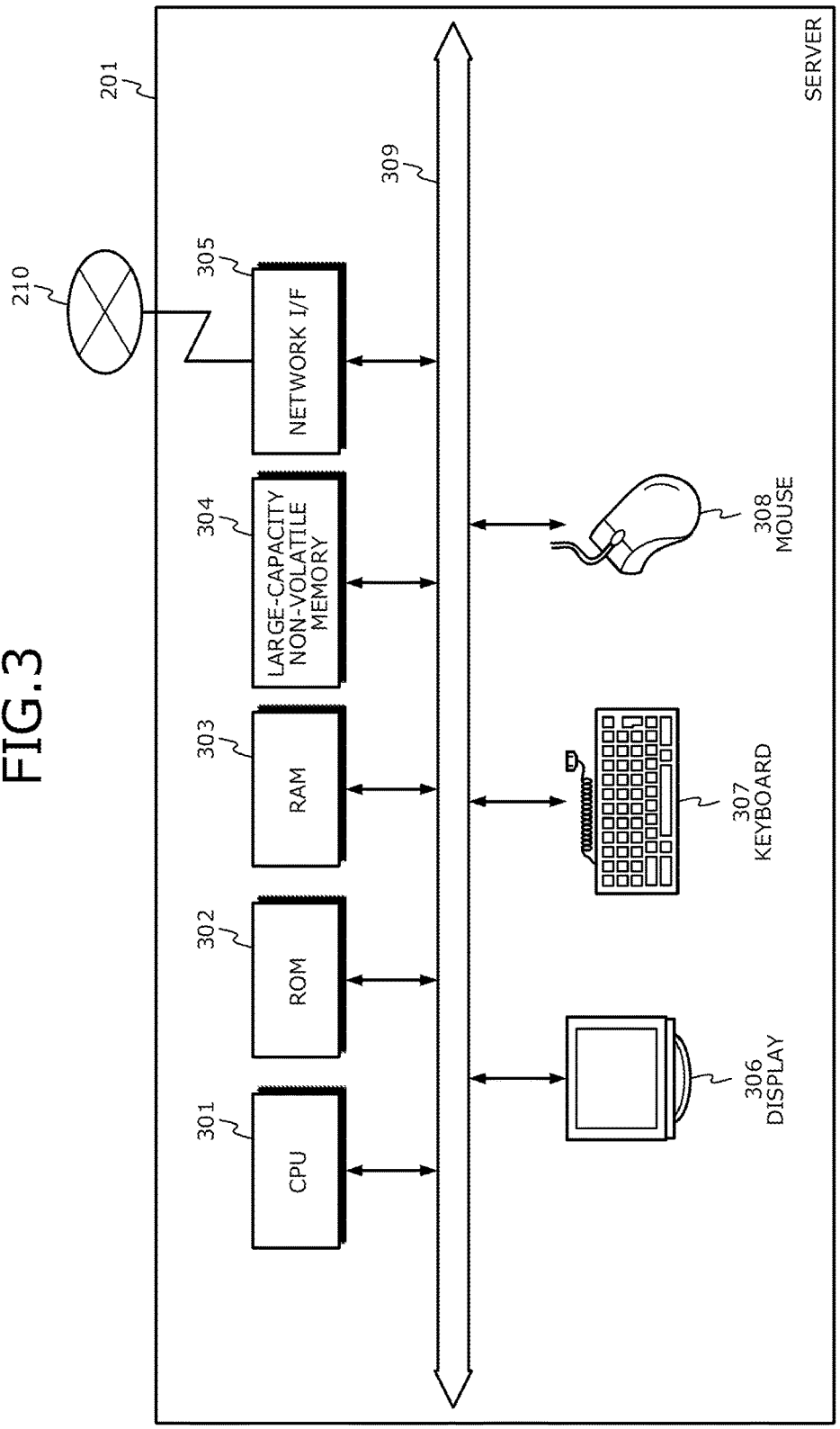

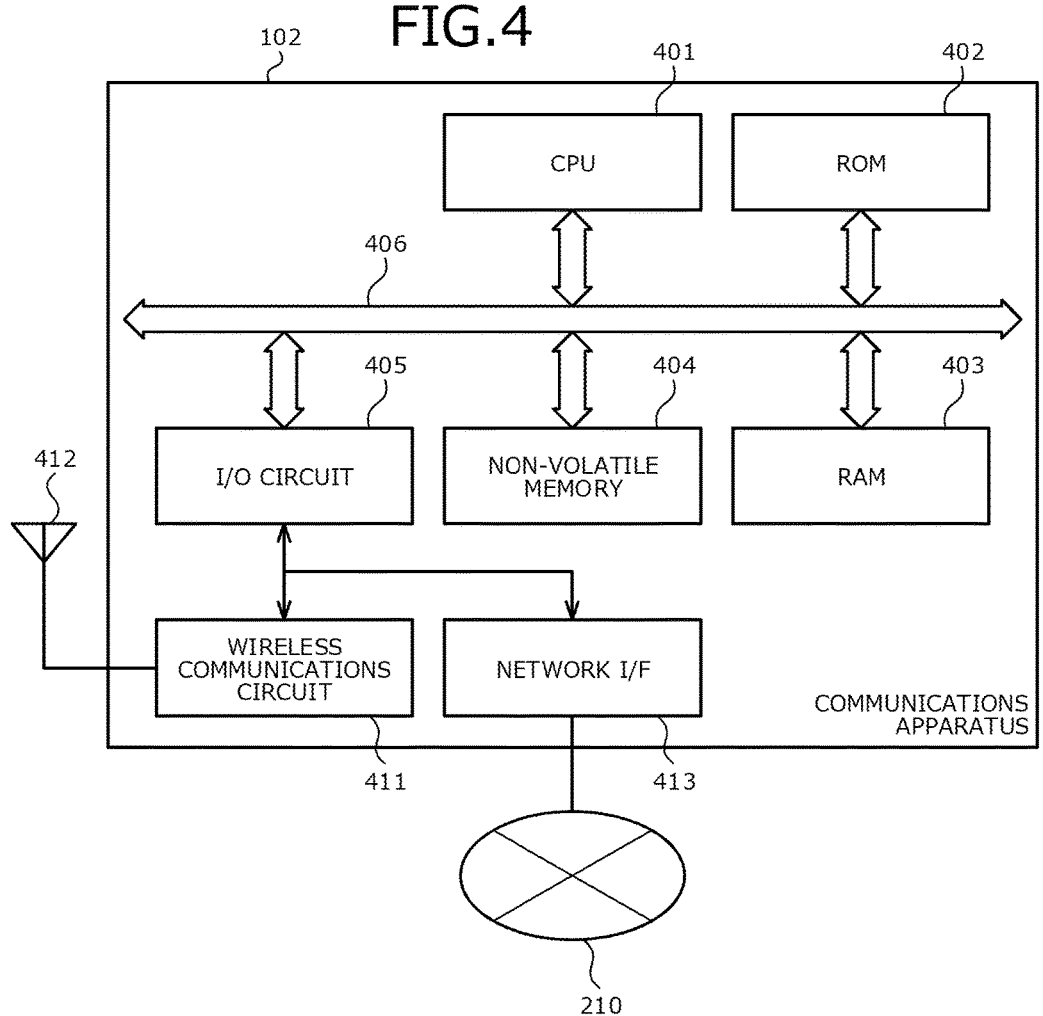
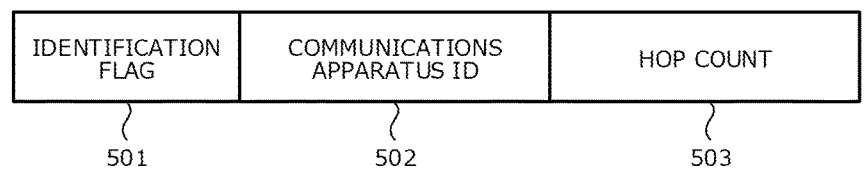

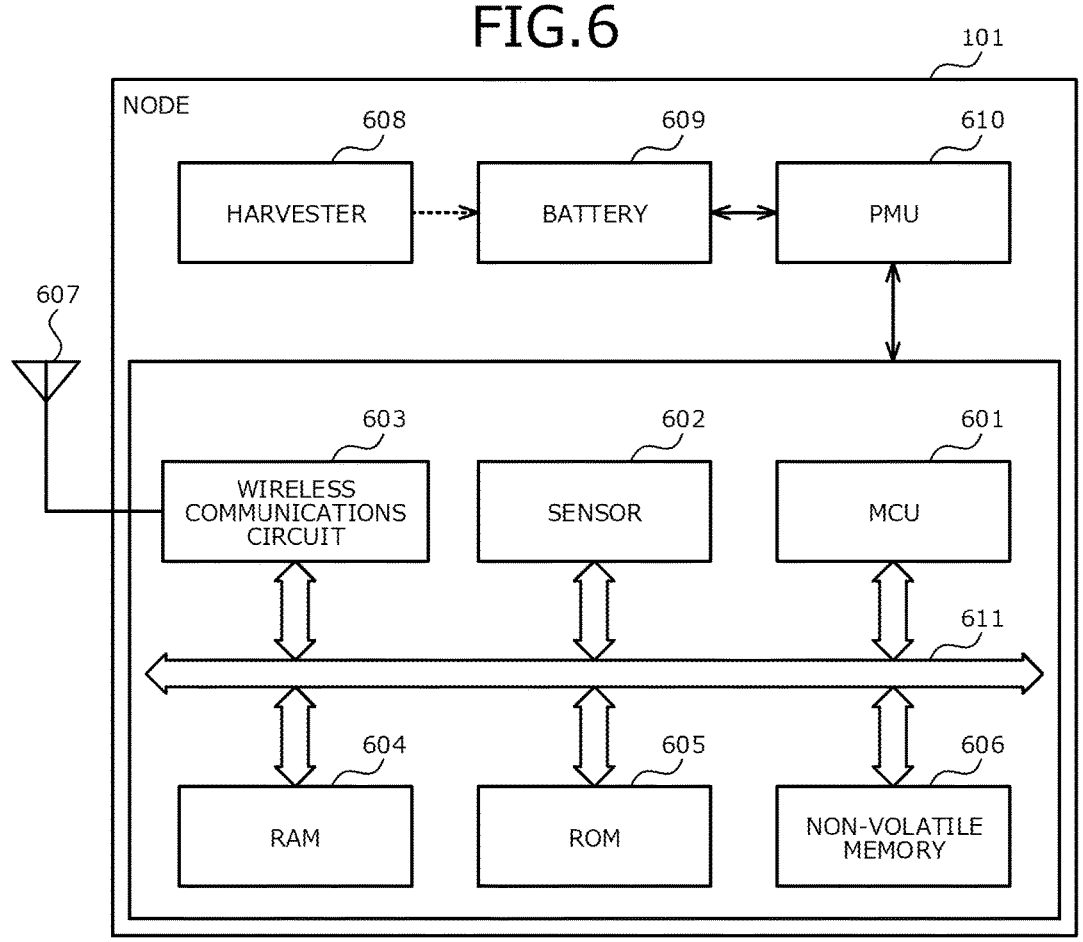

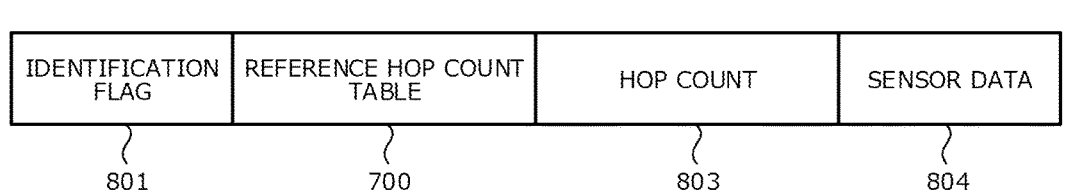
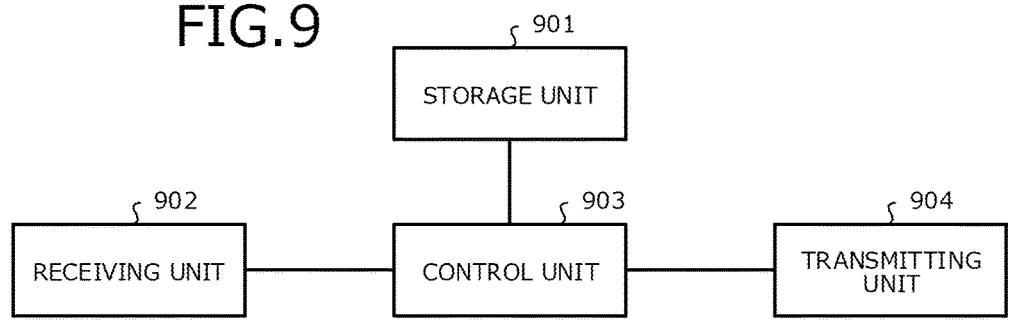
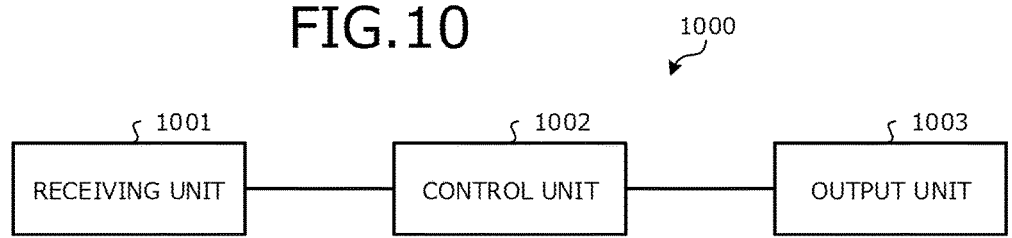

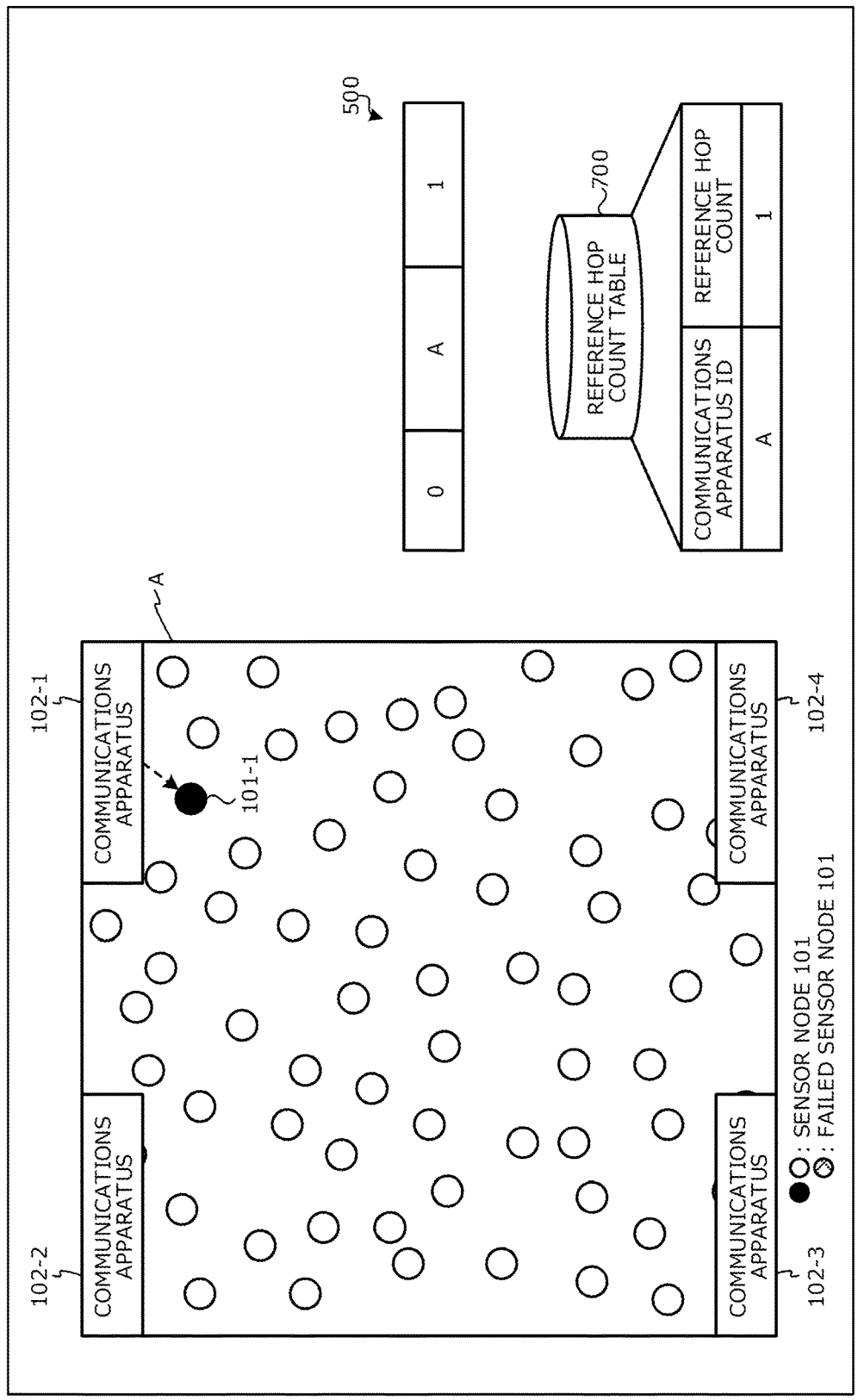

FIG.19

| FAILED NODE COUNT | 1 | 2 | 3 | 4 | 5 | 6 | 7 | 8 | 9 | 10 | AVERAGE |
|---|---|---|---|---|---|---|---|---|---|---|---|
| 0 | 17 | 17 | 18 | 17 | 16 | 17 | 18 | 17 | 18 | 17 | 17.2 |
| 10 | 18 | 17 | 18 | 18 | 17 | 17 | 18 | 17 | 18 | 17 | 17.5 |
| 20 | 17 | 17 | 18 | 17 | 18 | 17 | 18 | 17 | 18 | 17 | 17.4 |
| 30 | 18 | 17 | 18 | 18 | 17 | 17 | 18 | 17 | 18 | 17 | 17.5 |
| 40 | 17 | 18 | 18 | 19 | 18 | 17 | 18 | 18 | 18 | 18 | 17.9 |
| 50 | 18 | 19 | 18 | 17 | 19 | 18 | 20 | 18 | 17 | 18 | 18.2 |

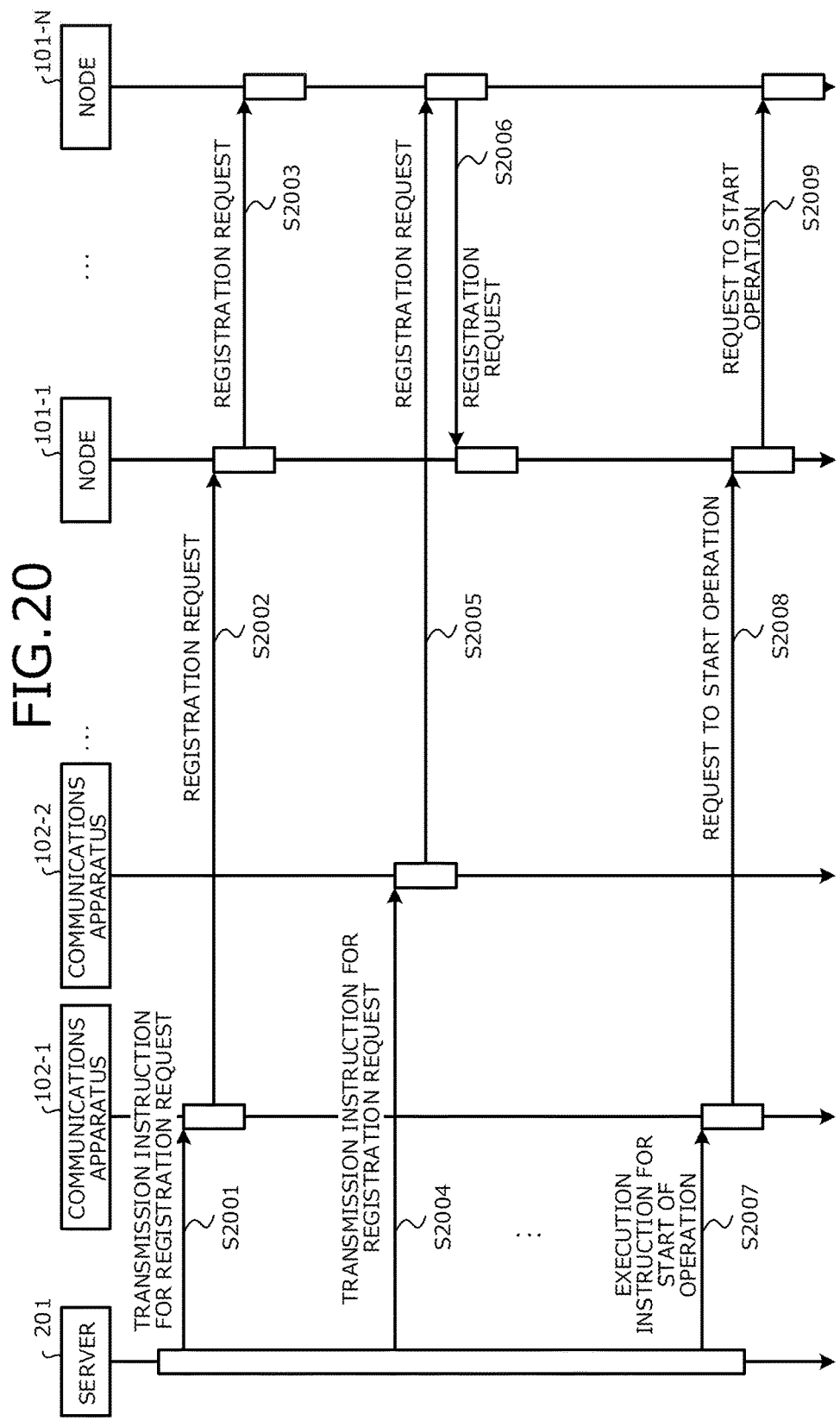

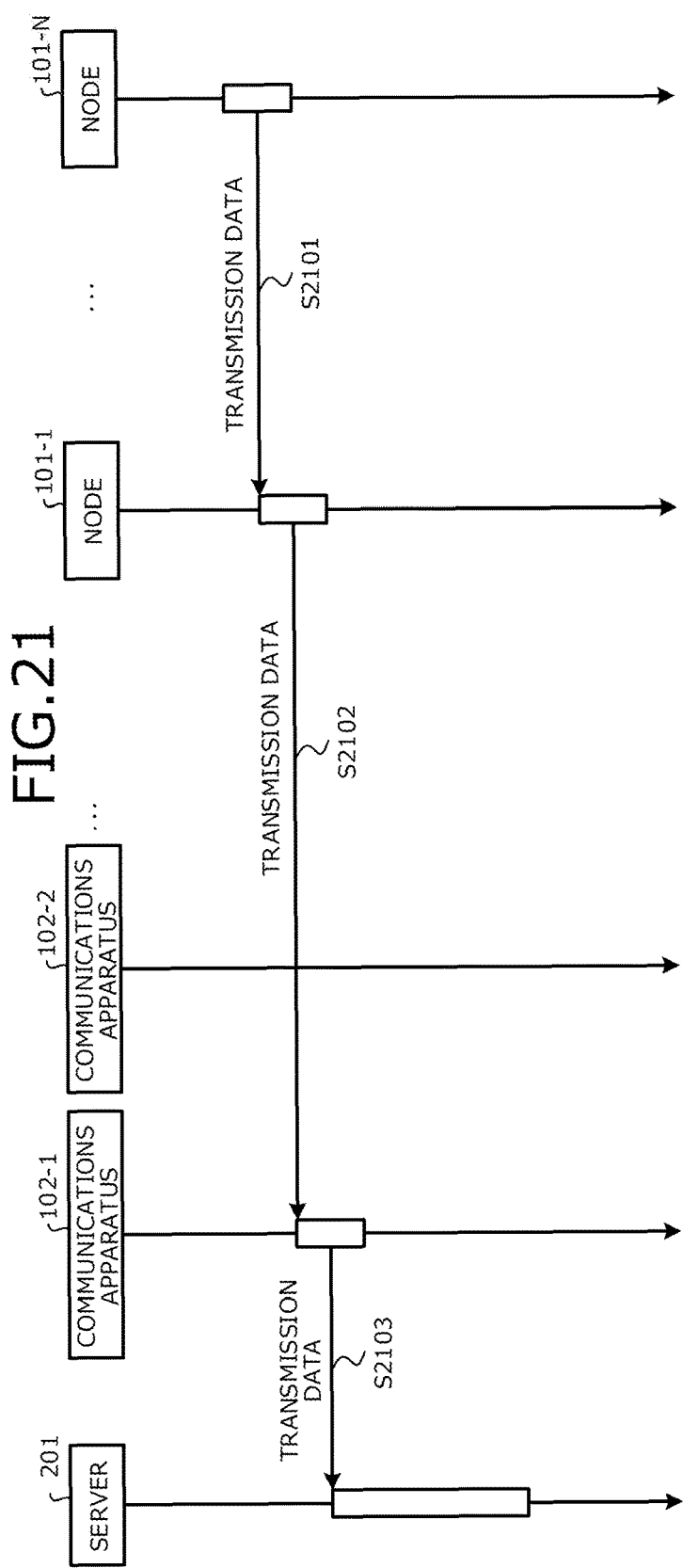

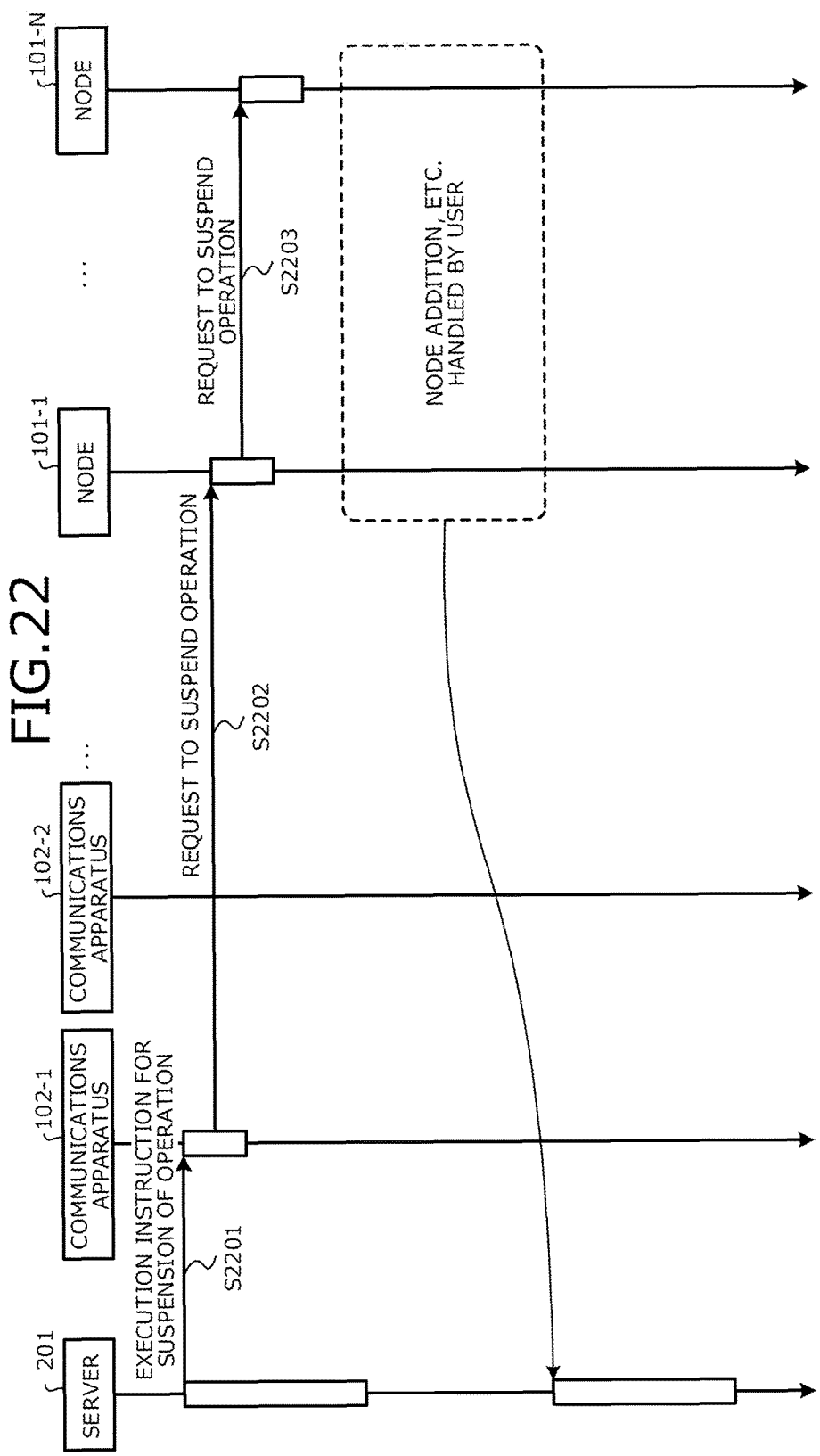

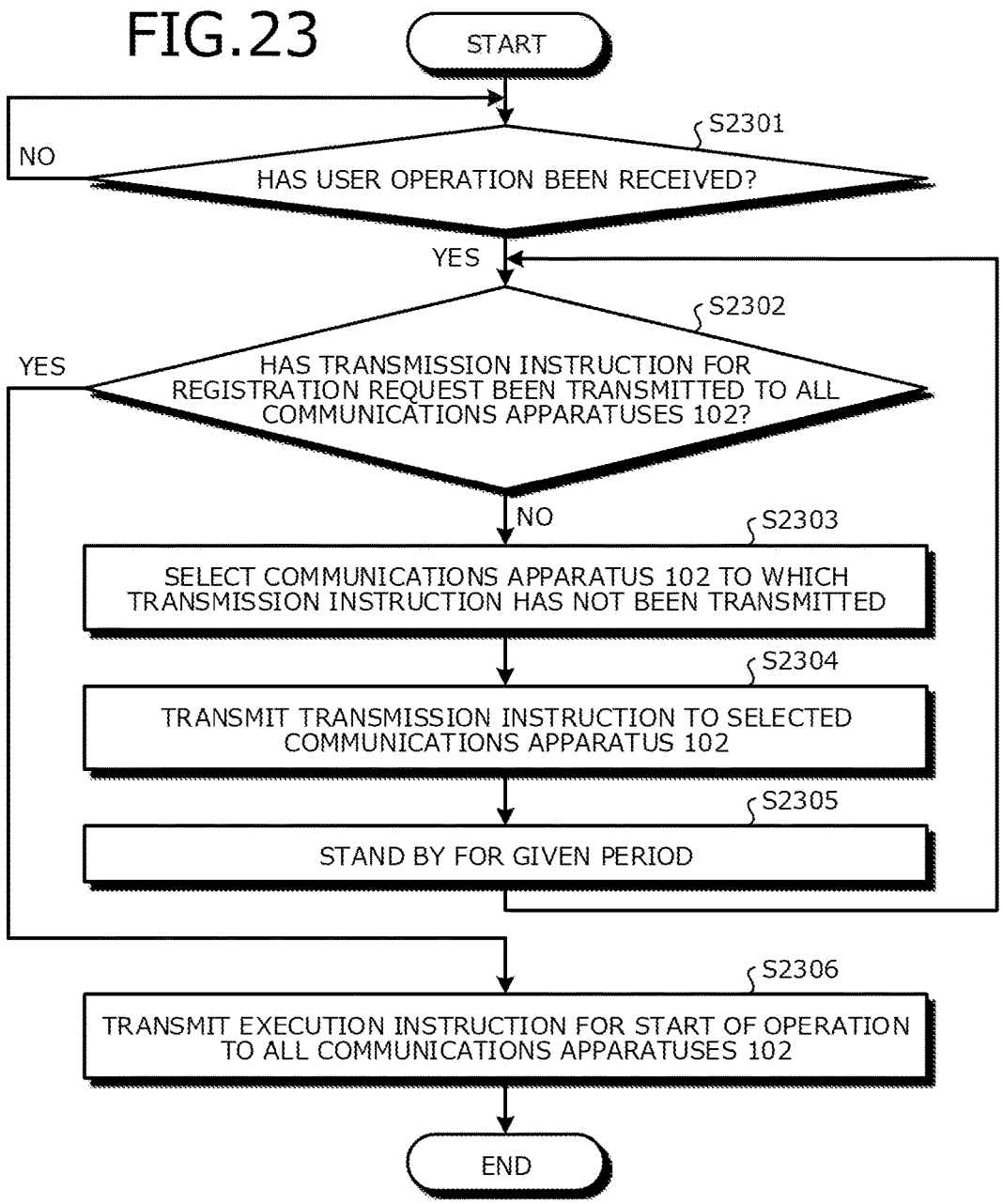

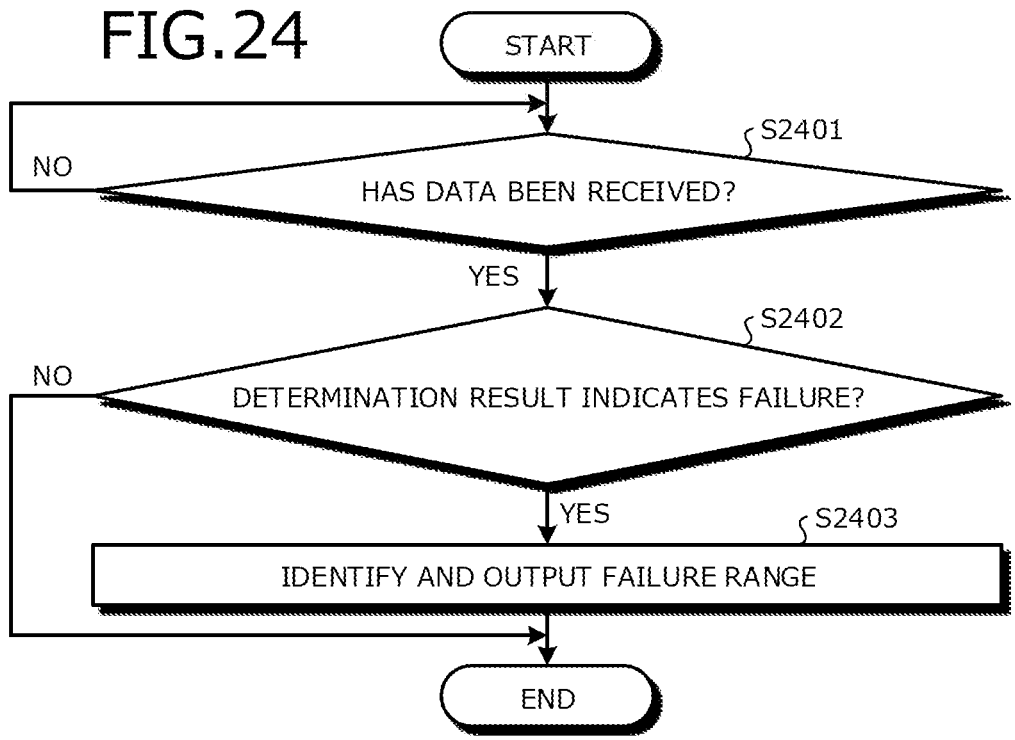
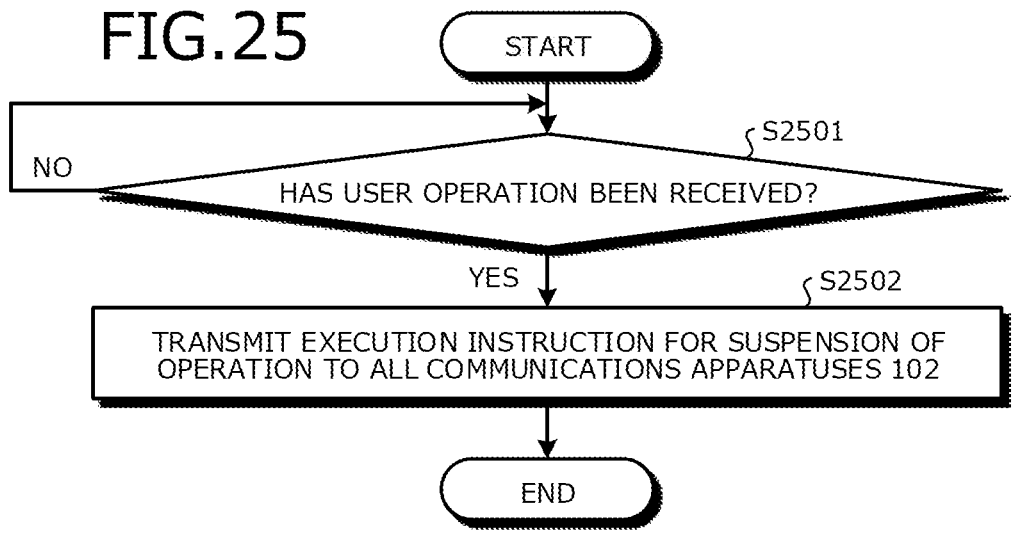

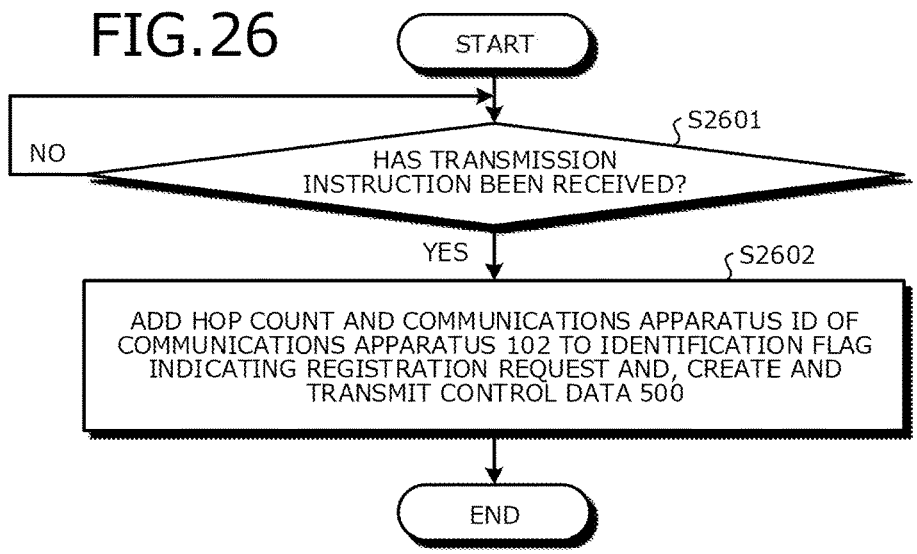
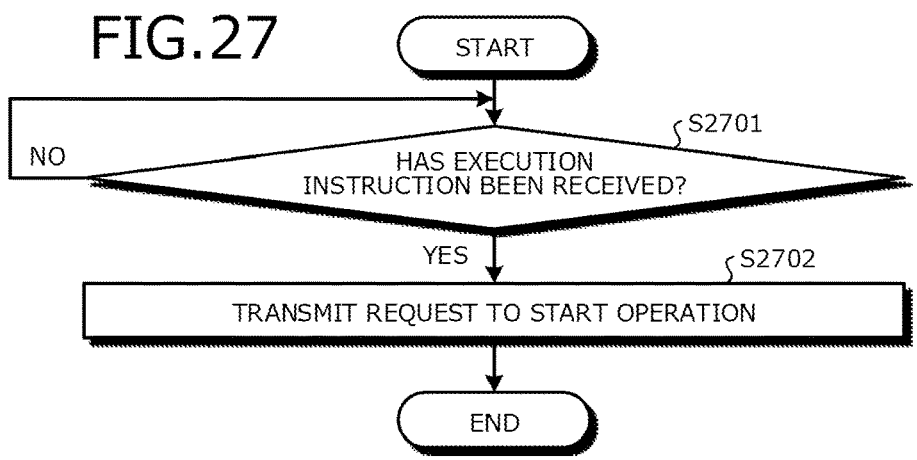
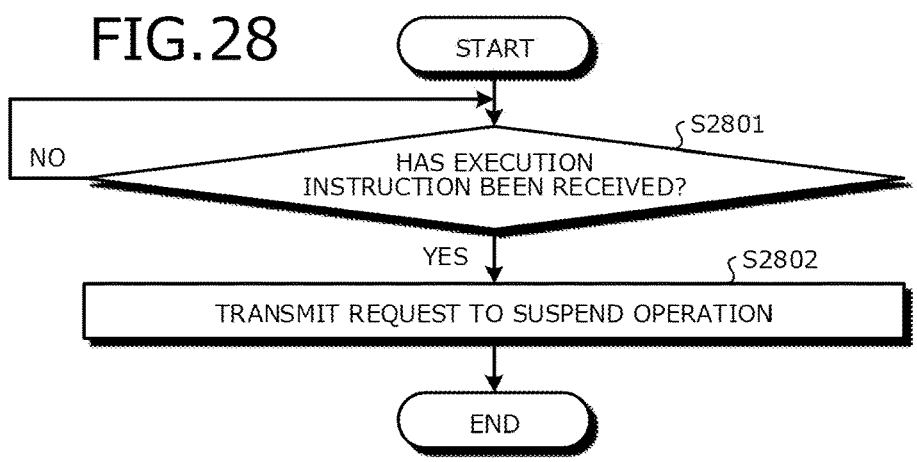

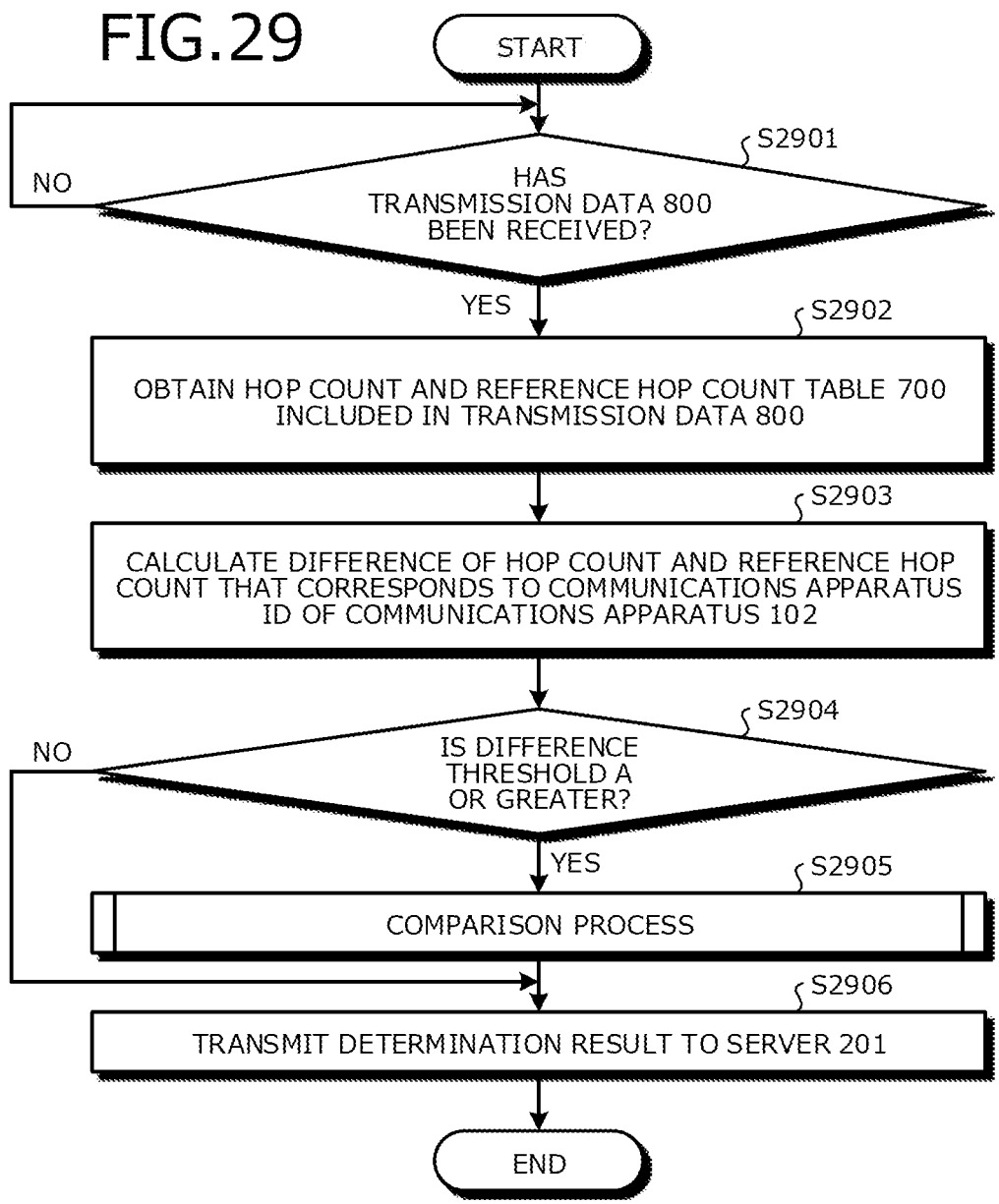

SYSTEM, NODE, FAILURE DETERMINING SYSTEM, FAILURE DETERMINING METHOD, AND COMPUTER PRODUCT

CROSS REFERENCE TO RELATED APPLICATIONS

This application is a continuation application of International Application PCT/JP2013/073543, filed on Sep. 2, 2013 and designating the U.S., the entire contents of which are incorporated herein by reference.

FIELD

The embodiments discussed herein are related to a system, a node, a failure determining apparatus, a failure determining method, and a computer product.

BACKGROUND

Conventionally, there are networks (wireless sensor networks (WSN)) in which nodes having sensors are interspersed in a given space and by multi-hop communication between the nodes, sensor data of the nodes are collected at a communications apparatus node that is an aggregator, enabling a physical state of the given space to be known.

Further, there is a technology called energy harvesting that generates electrical power using energy obtained according to the environment where installed. There is also technology that transmits acknowledgement (ACK) to a transmission side from a receiving side when communication ends and thereby, conveys to the transmission side that data has arrived properly.

According to a related technology, for example, in a mesh network, a node performs failure determination for a communication frame. More specifically, the node checks the hop count in a communication frame addressed to the node, determines whether the checked hop count is a maximum hop count stored in a maximum hop count storage unit, and if the hop count is not the maximum hop count, determines the communication frame to be an errant communication frame. For example, refer to Japanese Laid-Open Patent Publication No. 2012-15706.

SUMMARY

According to an aspect of an embodiment, a system has a group of nodes that perform multi-hop communication therebetween and a communications apparatus that communicates with a node included in the group of nodes. The node adds to data transmitted by the node, a hop count updated each time the data is transferred by the multi-hop communication and a reference hop count for the data to be transferred from the node to the communications apparatus, and transmits the data. The communications apparatus, when receiving the data, compares the reference hop count and the hop count added to the data, and based on a result of comparison, determines whether failure has occurred at a given node in the group of nodes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram depicting a connection example of a sensor network system 200;
FIG. 3 is a block diagram depicting an example of hardware configuration of a server 201;
FIG. 4 is a block diagram of an example of hardware configuration of a communications apparatus 102;
FIG. 5 is a diagram depicting on example of a data structure of control data 500;
FIG. 6 is a block diagram of an example of hardware configuration of a node 101;
FIG. 7 is a diagram depicting an example of contents stored in a reference hop count table 700;
FIG. 8 is a diagram depicting an example of a data structure of a transmission data 800;
FIG. 9 is a block diagram depicting an example of a functional configuration of the node 101;
FIG. 10 is a block diagram depicting an example of a functional configuration of a failure determining apparatus 1000;
FIG. 11 is a diagram depicting an example of a registration operation;
FIG. 19 is a diagram depicting an example of threshold configuration;
FIG. 20 is a sequence diagram of an example of cooperative operation for registration of the reference hop count table 700;
FIG. 21 is a sequence diagram of an example of cooperative operation for failure determination;
FIG. 22 is a sequence diagram of an example of cooperative operation for maintenance;
FIG. 23 is a flowchart of one example of a procedure of a transmission instruction process by the server 201;
FIG. 24 is a flowchart of one example of a procedure of a failure notification process by the server 201;
FIG. 25 is a flowchart of one example of a procedure of an execution instruction process for operation suspension by the server 201;
FIG. 26 is a flowchart of one example of a procedure of a registration request process by the communications apparatus 102;
FIG. 27 is a flowchart of one example of a procedure of an operation starting process by the communications apparatus 102;
FIG. 28 is a flowchart of one example of a procedure of an operation suspending process by the communications apparatus 102;
FIG. 29 is a flowchart of one example of a procedure of a failure determination process by the communications apparatus 102;

DESCRIPTION OF EMBODIMENTS

Embodiments of a system, a node, a failure determining apparatus, a failure determining method, and a failure determining program will be described in detail with reference to the accompanying drawings.

Figure 1:
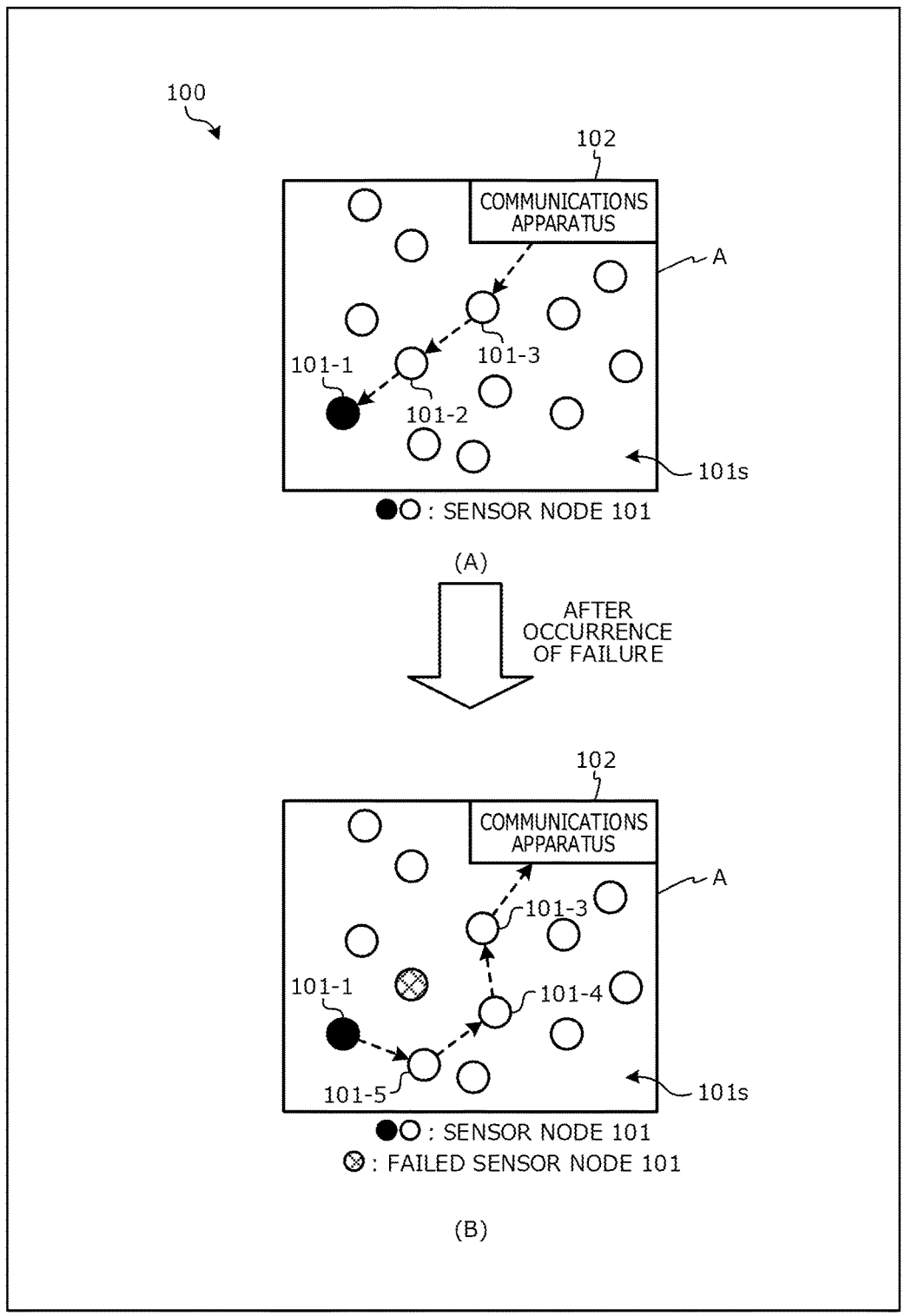
FIG. 1 is a diagram depicting an operation example of a system 100 according to the present embodiment.

FIG. 1 is a diagram depicting an operation example of a system 100 according to the present embodiment. In FIG. 1, the system 100 according to the present embodiment has a communications apparatus 102 and a node group 101s. The node group 101s forms a network 110.

The node group 101s includes nodes 101. In the description hereinafter, to distinguish the respective nodes 101, "-i" may be appended to "node 101". "i" is an arbitrary natural number. In other words, in the description hereinafter, a node 101 may be indicated as "node 101-i".

Each node 101 is a computer that has an energy harvesting element that generates power using energy obtained according to the environment in which the node 101 is installed, and operates using the power generated by the energy harvesting element and stored by a charging unit. Each node 101 is disposed within a given area A. The given area A, for example, is an area filled with a substance such as concrete, soil, water, air, etc.

Each node activates when sufficiently charged and performs intermittent operation of transmitting data and sleeping. Further, since the power generated by the energy harvesting element is limited, each node uses short range radio, which has low power consumption, and transmits and receives data by multi-hop communication. Each node 101 has a sensor and by the sensor, measures data for the temperature, humidity, stress, etc., in the given area A.

The communications apparatus 102 is a computer forming a collecting apparatus that collects sensor data from the nodes 101. The communications apparatus 102 is a so-called aggregator. The communications apparatus 102 may be plural. In the description hereinafter, to distinguish the respective communications apparatuses 102, "-j" may be appended to the "communications apparatus 102". "j" is an arbitrary natural number. In other words, in the description hereinafter, a communications apparatus 102 may be indicated as "communications apparatus 102-j". The network 110 is a communications network formed by each node included in the node group 101s using short-distance radio communication to connect to another node 101 within a communication area. The communication area is range that a wireless radio wave can reach.

A detailed operation example of the system 100 is depicted in (A) and (B) of FIG. 1. In the state depicted in (A) of FIG. 1, none of the nodes 101 included in the node group 101s has failed. In FIG. 1, (B) represents a state after the state depicted in (A) of FIG. 1, where a node 101 included in the node group 101s has failed.

In (A) of FIG. 1, the communications apparatus 102 transmits a registration request for a reference hop count. The reference hop count is a hop count that is a reference value for a data hop count of data transmitted by a node 101 and transferred to the communications apparatus 102 by multi-hop communication.

Each node 101, when receiving a registration request, obtains the hop count of the registration request and registers the obtained hop count as the reference hop count. For example, node 101-1 represented as "●" in FIG. 1, receives a registration request that is transmitted from the communications apparatus 102 and transferred from other nodes 101-2, 3 represented by "○" in FIG. 1. Next, node 101-1 stores the hop count "3" of the received registration request as the reference hop count.

Here, a node 101 of the node group 101s is assumed to fail and the reference of description changes to (B) of FIG. At this time, the nodes 101 have not detected that a failure has occurred at a node 101. Similarly, the communications apparatus 102 has not detected that a failure has occurred at a node 101.

In (B) of FIG. 1, each node 101, when transmitting data measured by the sensor to the communications apparatus 102, adds the reference hop count and transmits the measured data. In the description hereinafter, measured data from a sensor may be indicated as "sensor data". The communications apparatus 102 receives the sensor data transmitted from each node 101, compares the actual hop count of the received sensor data and the reference hop count added to the received sensor data, and determines whether a failure has occurred at a node 101 included in the node group 101s.

For example, the communications apparatus 102 receives sensor data that is transmitted from node 101-1 represented by "●" in FIG. 1 and transferred by other nodes 101-3 to 101-5 represented by "○" in FIG. 1. Next, the communications apparatus 102 compares the actual hop count "4" of the received sensor data and the reference hop count "3" added to the received sensor data. The communications apparatus 102 determines that a failure has occurred at a node 101 included in the node group 101s since the actual hop count is greater than the reference hop count.

In this manner, when a failure occurs at a node 101 included in the node group 101s, the hop count increases because communication that detours the node 101 is performed. As a result, the communications apparatus 102 can determine whether a failure has occurred at a node 101 included in the node group 101s.

A connection example of a sensor network system 200 in a case where the system 100 depicted in FIG. 1 is applied to a sensor network system 200 will be described with reference to FIG. 2.

FIG. 2 is a diagram depicting a connection example of the sensor network system 200. The sensor network system 200 has the communications apparatus 102, the node group 101s, a server 201, and a user terminal 202. The node group 101s forms the network 110. The communications apparatus 102, the server 201, and the user terminal 202 are connected through a network 210.

The server 201 is a computer used by a user of the sensor network system 200. The server 201 receives the sensor data collected by the communications apparatus 102 and transmitted from the communications apparatus 102, aggregates the sensor data, and performs analysis processing. The user terminal 202 is a computer that communicates with the communications apparatus 102, the server 201, etc.

The network 110 is a communications network connecting the node group 101s using short-distance radio communication. The network 210 is a communications network connecting plural computers by wired signals or wireless signals. The network 210, for example, is a local area network (LAN), a wide area network (WAN), etc.

An example of hardware configuration of the server 201 of the sensor network system 200 depicted in FIG. 2 will be described with reference to FIG. 3.

FIG. 3 is a block diagram depicting an example of hardware configuration of the server 201. In FIG. 3, the server 201 has a central processing unit (CPU 301), read-only memory (ROM 302), and random access memory (RAM 303).

The server 201 further has large-capacity non-volatile memory 304, and a network I/F 305. The server 201 has a display 306, a keyboard 307, and a mouse 308. Respective components from the CPU 301 to the mouse 308 are connected by a bus 309.

The CPU 301 is a computation processing apparatus that governs overall control of the server 201. The ROM 302 is non-volatile memory storing therein programs such as a boot program. The RAM 303 is volatile memory used as a work area of the CPU 301.

The large-capacity non-volatile memory 304 is a readable/writable storage apparatus and retains given written data even when power supply ceases. For example, a hard disk drive (HDD), flash memory, and the like are adopted as the large-capacity non-volatile memory 304.

The network I/F 305 administers an internal interface with the network 210 and is a control apparatus that controls the input and output of data from an external apparatus. More specifically, the network I/F 305 is connected to the network 210 through a communications line and is connected to other apparatuses through the network 210. A model, a LAN adapter, and the like can be adopted for the network I/F 305, for example.

The display 306 is an apparatus that displays data such as documents, images, and functional information in addition to a mouse cursor, icons, and toolboxes. A cathode ray tube (CRT), thin film transistor (TFT) liquid crystal display, a plasma display, and the like can be adopted as the display 306, for example.

The keyboard 307 has keys for inputting text, numerals, various instructions, etc. and is an apparatus that performs data input. Further, the keyboard 307 may be a touch panel input pad, a numeric pad, and the like. The mouse 308 is an apparatus that moves the mouse cursor, selects a region, or moves and changes the size of windows. The mouse 308 may be a track ball or a joy stick provided each respectively has a function similar to a pointing device.

An example of hardware configuration of the user terminal 202 will be described. An example of hardware configuration of the user terminal 202 is the same as the example of hardware configuration of the server 201 depicted in FIG. 3. The user terminal 202, for example, is a smartphone, a mobile telephone, a PDA, or the like.

An example of hardware configuration of the communications apparatus 102 of the sensor network system 200 depicted in FIG. 2 will be described with reference to FIG. 4.

FIG. 4 is a block diagram of an example of hardware configuration of the communications apparatus 102. The communications apparatus 102 has a processor (CPU) 401, ROM 402, RAM 403, non-volatile memory 404, an interface (Input/Output (I/O)) circuit 405, a wireless communications circuit 411, an antenna 412, and a network I/F 413.

The communications apparatus 102 further has a bus 406 that connects the CPU 401, the ROM 402, the RAM 403, the non-volatile memory 404, and the I/O circuit 405. The communications apparatus 102, unlike the nodes 101, may operate by an external power supply or by an internal power supply.

The CPU 401 is a computation processing apparatus that governs overall control of the communications apparatus 102. The ROM 402 is non-volatile memory that stores programs such as a boot program. The RAM 403 is volatile memory used as a work area of the CPU 401. The non-volatile memory 404 is a readable/writable storage apparatus and retains given written data even when power supply ceases. For example, a HDD, flash memory, and the like are adopted for the non-volatile memory 404.

The I/O circuit 405 is connected to the wireless communications circuit 411 and the network I/F 413. Thus, the communications apparatus 102 can wirelessly communicate with nearby nodes 101 through the wireless communications circuit 411 and the antenna 412. The communications apparatus 102 can communicate with the user terminal 202 and the server 201, through the network I/F 413 and by an Internet Protocol (IP) process and the like through the network 210 such as the Internet.

An example of a data structure of control data 500 that includes a registration request and is transmitted by the communications apparatus 102 depicted in FIG. 4 will be described with reference to FIG. 5.

FIG. 5 is a diagram depicting on example of a data structure of the control data 500. As depicted in FIG. 5, the control data 500 includes an identification flag region 501, communications apparatus ID region 502, and a hop count region 503. The identification flag is a flag that indicates a registration request. The communications apparatus ID is data identifying the communications apparatus 102 that transmitted the registration request. The hop count is the hop count of the registration request. The hop count is updated each time the registration request is transferred by a node 101.

An example of hardware configuration of a node 101 included in the node group 101s of the sensor network system 200 depicted in FIG. 2 will be described with reference to FIG. 6.

FIG. 6 is a block diagram of an example of hardware configuration of a node 101. The node 101 has a microprocessor (micro control unit (MCU)) 601, a sensor 602, a wireless communications circuit 603, a RAM 604, ROM 605, non-volatile memory 606, an antenna 607, a harvester 608, a battery 609, and a power management unit (PMU) 610. The node 101 further has a bus 611 that connects the MCU 601, the sensor 602, the wireless communications circuit 603, the RAM 604, the ROM 605, and the non-volatile memory 606.

The MCU 601 is a computation processing apparatus that governs overall control of the node 101. For example, the MCU 601 processes data detected by the sensor 602. The sensor 602 is an apparatus that detects a given change at the installation site. The sensor 602, for example, may be a piezoelectric element that detects pressure, an element that detects temperature, a photoelectric element that detects light, etc., at the installation site.

The antenna 607 transmits and receives radio waves wirelessly communicated with the communications apparatus 102, which is a parent apparatus. The wireless communications circuit 603 (radio frequency (RF)) outputs a received wireless radio wave as a reception signal and transmits a transmission signal as a wireless radio wave, through the antenna 607. The wireless communications circuit 603 may be a communications circuit that uses short-distance radio communication capable of communicating with another node 101 in a vicinity of a few 10 cm.

The RAM 604 is a storage apparatus storing therein transient data of processing at the MCU 601. The ROM 605 is a storage apparatus storing therein processing programs executed by the MCU 601. The non-volatile memory 606 is a writable storage apparatus and retains given written data even when power supply ceases. For example, flash memory is adopted as the non-volatile memory 606.

The harvester 608 is the energy harvesting element depicted in FIG. 1 and is an apparatus that generates power based on energy changes such as variations in light, oscillation, temperature, radio waves (received radio waves), etc. in the external environment at the installation site of the node 101, for example. Further, the harvester 608 may generate power according to the variations detected by the sensor 602.

The battery 609 is an apparatus that stores the power generated by the harvester 608. In other words, the node 101 does not need a secondary battery or external power source and internally generates power. The PMU 610 is an apparatus that controls the supply of the power stored by the battery 609, as a drive source of the components of the node 101.

An example of the contents stored by a reference hop count table 700 of the node 101 depicted in FIG. 6 will be described with reference to FIG. 7. The reference hop count table 700, for example, is realized by a storage region such as the RAM 604 and the non-volatile memory 606 depicted in FIG. 6, etc.

FIG. 7 is a diagram depicting an example of the contents stored in the reference hop count table 700. As depicted in FIG. 7, the reference hop count table 700 has a reference hop count field associated with a communications apparatus ID field and by setting information for each the communications apparatus 102, the information is stored as records.

In the communications apparatus ID field, the communications apparatus ID included in a received registration request is stored. In the reference hop count field, the reference hop count included in the received registration request is stored. For example, record 701 represents reference hop count information including a communications apparatus ID "A" and a reference hop count "4".

An example of a data structure of transmission data 800 that includes sensor data and is transmitted by the node 101 depicted in FIG. 6 will be described with reference to FIG. 8.

FIG. 8 is a diagram depicting an example of a data structure of the transmission data 800. As depicted in FIG. 8, the transmission data 800 includes an identification flag region 801, a region 802 of the reference hop count table 700, a hop count region 803, and a sensor data region 804. The identification flag is a flag that indicates sensor data. The reference hop count table 700 is replicated data of the reference hop count table 700 depicted in FIG. 7. The hop count is data representing the hop count of the transmission data 800. The hop count is updated each time the transmission data 800 is transferred by a node 101. The sensor data is data measured by the sensor.

An example of a functional configuration of the node 11 will be described with reference to FIG. 9.

FIG. 9 is a block diagram depicting an example of a functional configuration of the node 101. The node 101 includes a storage unit 901, a receiving unit 902, a control unit 903, and a transmitting unit 904. Functions of the receiving unit 902, the control unit 903, and the transmitting unit 904, for example, are realized by executing on the MCU 601, a program stored in a storage apparatus such as the RAM 604, the ROM 605, and the non-volatile memory 606 depicted in FIG. 6, etc., or by the wireless communications circuit 603.

The storage unit 901 stores the reference hop count table 700. A function of the storage unit 901, for example, is realized by a storage apparatus such as the RAM 604 and the non-volatile memory 606 depicted in FIG. 6, etc. By these, the control unit 903 can add to transmission data, the reference hop count table 700 stored in the storage unit 901.

The receiving unit 902 receives a registration request. Here, the registration request is a request to register a reference hop count into the reference hop count table 700. The reference hop count is a hop count that is to be a reference value for the hop count of the data transmitted from the nodes 101 and transferred to the communications apparatus 102 by multi-hop communication. The receiving unit 902, for example, receives the control data 500 that includes the registration request. As a result, the control unit 903 can register the reference hop count into the reference hop count table 700 based on the registration request received by the receiving unit 902.

The control unit 903 stores to the storage unit 901 as a reference hop count, the hop count added to registration request. The control unit 903, for example, extracts the communications apparatus ID and hop count from the control data 500 that includes the registration request and registers a record associating the extracted communications apparatus ID and hop count into the reference hop count table 700. As a result, the control unit 903 can add to transmission data, the reference hop count table 700 stored in the storage unit 901.

Further, when a record that includes the extracted communications apparatus ID has already been stored in the reference hop count table 700, the control unit 903 compares the extracted hop count and the hop count stored in the reference hop count table 700. The control unit 903 overwrites the record in the reference hop count table 700 with a record associating the extracted communications apparatus ID and hop count, when the extracted hop count is smaller. As a result, the control unit 903 can add to transmission data, the reference hop count table 700 stored in the storage unit 901.

The control unit 903 detects a transmission event of sensor data. Here, the sensor data is data measured by the sensor. The control unit 903, for example, as a transmission event of sensor data, detects that the sensor has measured sensor data. Further, as a transmission event, the control unit 903, for example, detects that a transmission request for sensor data has been received. As a result, the control unit 903 can start creating the transmission data 800 that includes sensor data.

The control unit 903 adds to data, a hop count that is updated each time the data transmitted from the node 101 of the control unit 903 to the communications apparatus 102 is transferred by multi-hop communication and a reference hop count for data to be transferred from the node 101 of the control unit 903 to the communications apparatus 102. Here, multi-hop communication is communication performed by a relaying of data by the nodes as the nodes 101 transfer data from a node in the communication area to another node in the communication area. The control unit 903, for example, adds an identification flag, the reference hop count table 700, and the hop count to sensor data to create the transmission data 800. As a result, the transmitting unit 904 can transmit the transmission data 800 that includes sensor data.

The transmitting unit 904 transmits the transmission data 800 created by the control unit 903. As a result, the communications apparatus 102 can receive the transmission data 800. The communications apparatus 102 collects sensor data included in the transmission data 800 and from the hop count and the reference hop count included in the transmission data 800, can determine whether a failure has occurred at a node 101 included in the node group 101s.

An example of a functional configuration of a failure determining apparatus 1000 will be described with reference to FIG. 10. The failure determining apparatus 1000, for example, is realized by the communications apparatus 102 depicted in FIG. 4. Further, the failure determining apparatus 1000 may be realized by the server 201 depicted in FIG. 3 and the communications apparatus 102 depicted in FIG. 4. The failure determining apparatus 1000 may be realized by the server 201 depicted in FIG. 3. Hereinafter, a case will be described where the failure determining apparatus 1000 is realized by the communications apparatus 102 depicted in FIG. 4.

FIG. 10 is a block diagram depicting an example of a functional configuration of the failure determining apparatus 1000. The failure determining apparatus 1000 includes a receiving unit 1001, a control unit 1002, and an output unit 1003. Functions of the receiving unit 1001, the control unit 1002, and the output unit 1003, for example, are realized by executing on the CPU 401, a program stored in a storage apparatus such as the ROM 402, the RAM 403, and the non-volatile memory 404 depicted in FIG. 4, or by the interface circuit 405 and the wireless communications circuit 411. Here, the failure determining apparatus 1000 can perform an operation of transmitting to a node 101, a registration request for the reference hop count and an operation of performing failure determination.

The operation of transmitting a registration request for the reference hop count to a node 101 will be described. The operation of transmitting a registration request, for example, is realized by the receiving unit 1001, the control unit 1002, and the output unit 1003.

The receiving unit 1001 receives a transmission instruction for a registration request. The receiving unit 1001, for example, receives a transmission instruction for a registration request transmitted from the server 201 depicted in FIG. 3, or a transmission instruction for a registration request transmitted from the user terminal 202 depicted in FIG. 3. As a result, the control unit 1002 can start creating a registration request.

Here, the receiving unit 1001 has been described for a case where the failure determining apparatus 1000 is realized by the communications apparatus 102; however, configuration is not limited hereto. For example, when the failure determining apparatus 1000 is realized by the server 201, the receiving unit 1001 may receive a transmission instruction for a registration request by operation input using the keyboard 307 and/or the mouse 308 depicted in FIG. 3.

The control unit 1002 adds to the registration request, the hop count that is updated each time the registration request for the reference hop count transmitted from the communications apparatus 102 is transferred by multi-hop communication and creates the control data 500. The control unit 1002, for example, adds the communications apparatus ID and the hop count to the identification flag that indicates a registration request and creates the control data 500. As a result, the output unit 1003 can transmit the control data 500.

Here, the control unit 1002 has been described for a case where the failure determining apparatus 1000 is realized by the communications apparatus 102; however, configuration is not limited hereto. For example, when the failure determining apparatus 1000 is realized by the server 201, the control unit 1002 may create the control data 500 that includes a registration request to be relayed by the communications apparatus 102 as a relay apparatus with the nodes 101.

The output unit 1003 transmits the control data 500 created by the control unit 1002. As a result, the node 101 can register into the reference hop count table 700, a record associating the communications apparatus ID and reference hop count.

Here, the output unit 1003 has been described in a case where the failure determining apparatus 1000 is realized by the communications apparatus 102; however, configuration is not limited hereto. For example, when the failure determining apparatus 1000 is realized by the server 201, the output unit 1003 may transmit the control data 500 to the communications apparatus 102 and cause the communications apparatus 102 to relay the control data 500.

The operation of performing failure determination will be described. The operation of performing failure determination, for example, is realized by the receiving unit 1001, the control unit 1002, and the output unit 1003.

The receiving unit 1001 receives the transmission data 800 transmitted by a node 101. As a result, the control unit 1002 can perform failure determination, based on the reference hop count table 700 and the hop count included in the transmission data 800 received by the receiving unit 1001.

Here, the receiving unit 1001 has been described for a case where the failure determining apparatus 1000 is realized by the communications apparatus 102; however, configuration is not limited hereto. For example, when the failure determining apparatus 1000 is realized by the server 201, the receiving unit 1001 receives the transmission data 800 that is transmitted by the node 101, received by the communications apparatus 102, and further received from the communications apparatus 102.

The control unit 1002 compares the hop count added to the data and the reference hop count, and based on the comparison result, determines whether a failure has occurred at a node 101 of the node group 101s. The control unit 1002, for example, determines that a failure has occurred at a node 101 of the node group 101s, when the hop count added to the transmission data 800 is greater than the reference hop count by a given value or more. The control unit 1002, more specifically, subtracts the reference hop count from the hop count added to the transmission data 800 to calculate the difference. The control unit 1002 determines whether the difference is greater than a threshold A and when the difference is greater than the threshold A, determines that a failure has occurred at a node 101 of the node group 101s.

Further, the control unit 1002, for example, receives the data in plural and when the hop counts added to the data are greater than the reference hop counts by a given value or more for than a given number of times or more, the control unit 1002 may determine that a failure has occurred at a node 101 of the node group 101s. The control unit 1002, more specifically, for each of the transmission data 800 among plural transmission data 800 received in the past, subtracts the reference hop count from the hop count added to the transmission data 800 and calculates the difference. The control unit 1002 determines that a failure has occurred at a node 101 of the node group 101s, when the difference is greater than the threshold A for a number of times that exceeds a threshold B. As a result, the control unit 1002 can determine and output whether a failure has occurred at a node 101 of the node group 101s.

Here, the control unit 1002 has been described in a case where the failure determining apparatus 1000 is realized by the communications apparatus 102; however, configuration is not limited hereto. For example, when the failure determining apparatus 1000 is realized by the server 201, the control unit 1002 may determine whether a failure has occurred at a node 101 of the node group 101s, based on the transmission data 800 received from the communications apparatus 102.

The output unit 1003 associates and outputs the determination result and the reference hop count. Further, the output unit 1003 associates and outputs the determination result, the reference hop count, and the identification information of the communications apparatus 102. The form of output, for example, is transmission to the server 201. As a result, the user can identify the location where a failure has occurred.

Here, the output unit 1003 has been described in a case where the failure determining apparatus 1000 is realized by the communications apparatus 102; however, configuration is not limited hereto. For example, when the failure determining apparatus 1000 is realized by the server 201, the output unit 1003 may associate and display on the display 306, the determination result, the reference hop count, and the identification information of the communications apparatus 102.

An example of a registration operation of the reference hop count table 700 will be described with reference to FIGS. 11 and 12.

Figure 12:
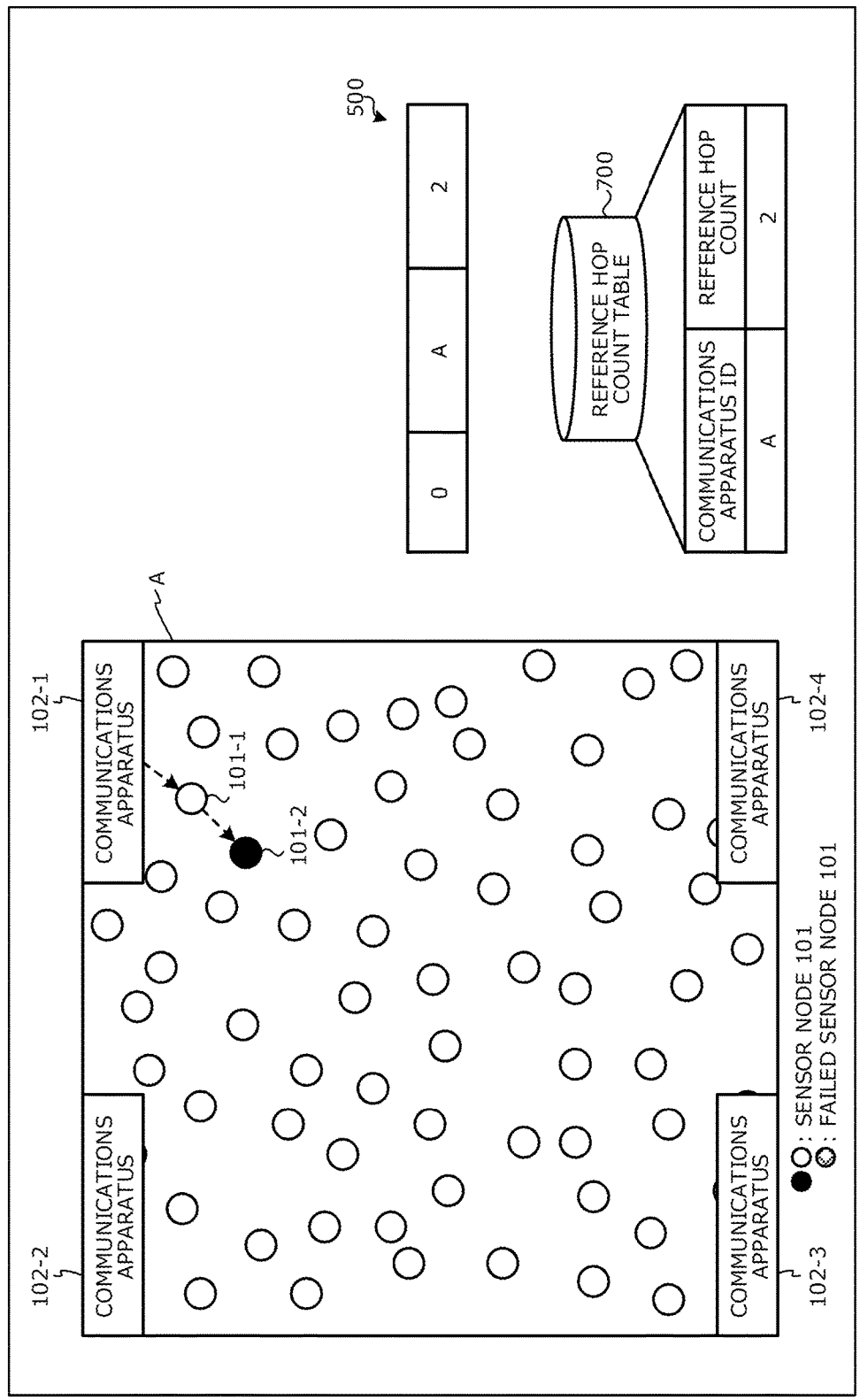
FIG. 12 is a diagram depicting an example of the registration operation.

FIGS. 11 and 12 are diagrams depicting an example of the registration operation. In FIGS. 11 and 12, the communications apparatus 102 transmits the control data 500 that includes a registration request. When receiving from the communications apparatus 102 or another node 101, the control data 500 that includes a registration request, the node 101 registers into the reference hop count table 700, a record associating the hop count and the communications apparatus ID included in the control data 500. The node 101 increments the hop count included in the control data 500 and performs transmission within the communication area.

In the example depicted in FIG. 11, the communications apparatus 102-1 adds the communications apparatus ID "A" and the hop count "1" to the identification flag "0" indicating a registration request and, creates and transmits the control data 500. The node 101-1 that is within the communication area of the communications apparatus 102-1 and indicated by "●" in FIG. 11 registers into the reference hop count table 700, a record associating the hop count "1" and the communications apparatus ID "A" included in the control data 500, when receiving the control data 500 transmitted from the communications apparatus 102-1. The node 101-1 indicated by "●" in FIG. 11 increments the hop count "1" included in the control data 500 to update the hop count to "2", and transmits the control data 500 within the communication area. The reference of description changes to FIG. 12.

In the example depicted in FIG. 12, the node within the communication area of the node 101-1 described above and 101-2 indicated by "●" in FIG. 12, when receiving the control data 500 transmitted from the node 101-1, registers into the reference hop count table 700, a record associating the hop count "2" and the communications apparatus ID "A" included in the control data 500. The node 101-2 indicated by "●" in FIG. 12 increments the hop count "2" included in the control data 500 to update the hop count to "3", and transmits the control data 500 within the communication area.

In this manner, each node 101 of the node group 101s can register into the reference hop count table 700, a record that includes the communications apparatus ID "A". Further, the other communications apparatuses 102 also similarly transmit the control data 500 that includes a registration request. As a result, each node 101 of the node group 101s can register into the reference hop count table 700, records that include the communications apparatus IDs.

An example of failure determination operation will be described with reference to FIGS. 13 to 17.

FIGS. 13, 14, 15, 16, and 17 are diagrams depicting the failure determination operation. In FIGS. 13 to 17, a node 101, when measuring sensor data by the sensor, creates the transmission data 800 that includes the sensor data and transmits the transmission data 800 within the communication area. Further, a node 101, when receiving the transmission data 800, increments the hop count included in the transmission data 800 and transmits the transmission data 800 within the communication area. The communications apparatus 102, when receiving the transmission data 800, performs failure determination.

Figure 13:
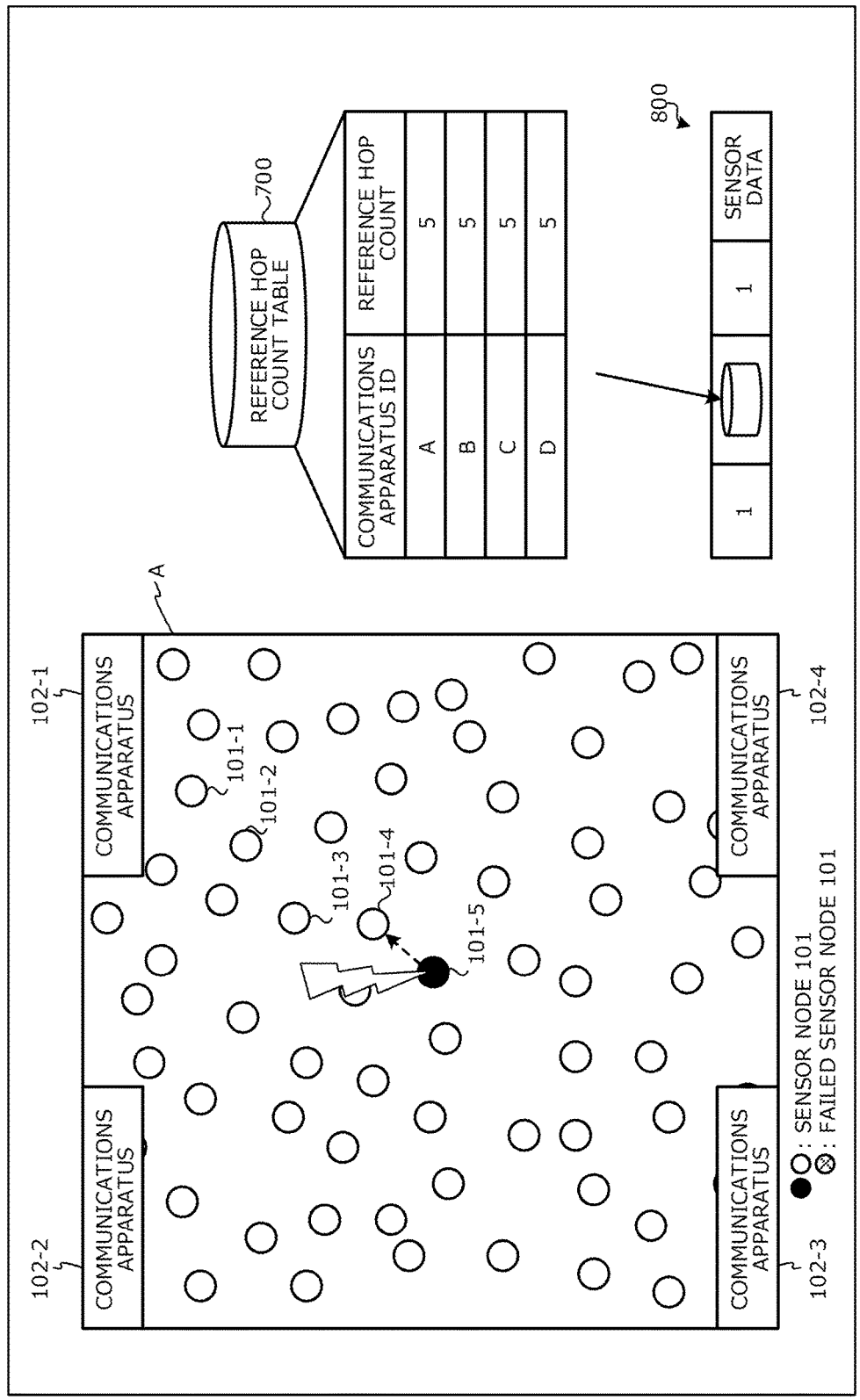
FIG. 13 is a diagram depicting a failure determination operation.
Figure 14:
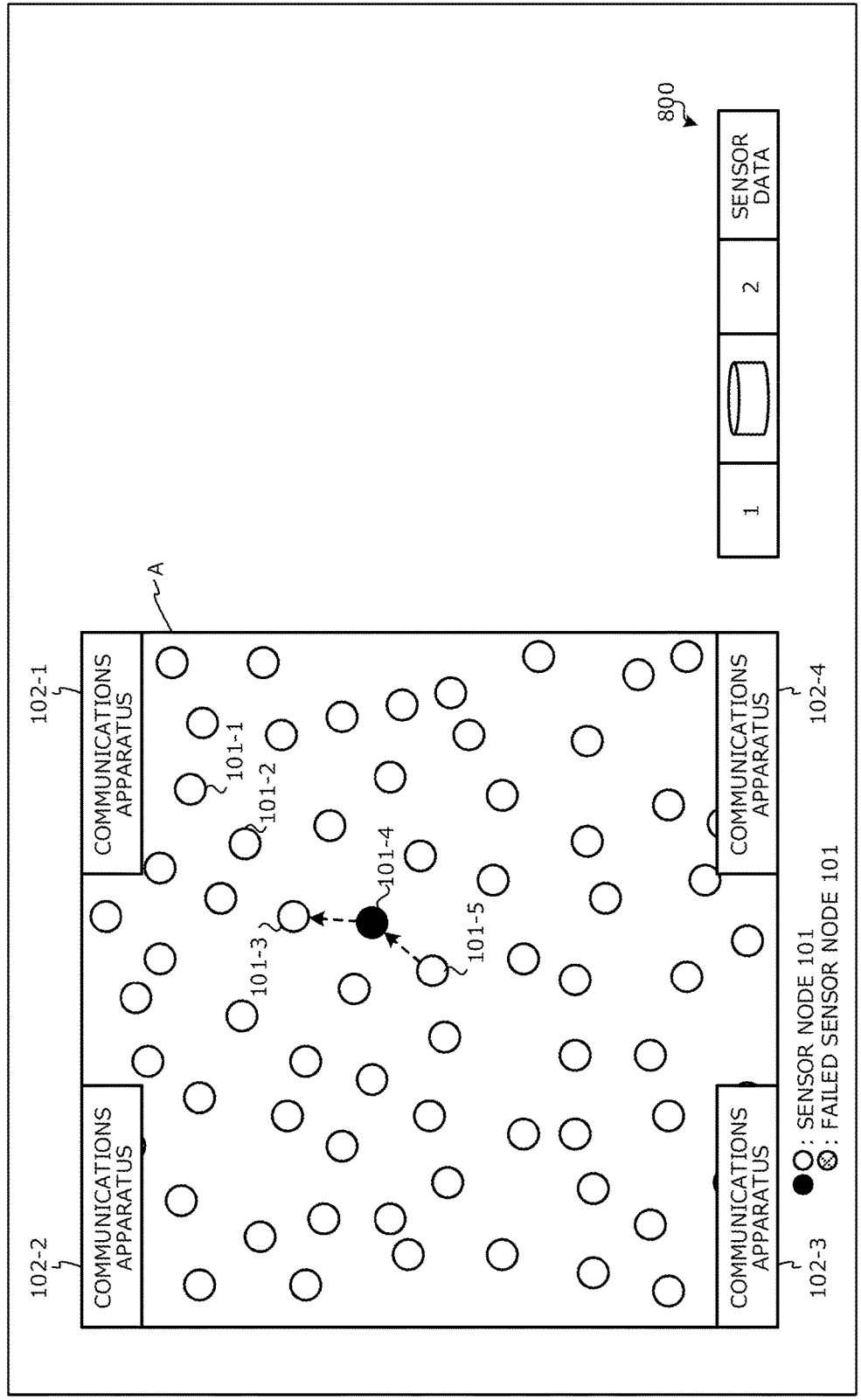
FIG. 14 is a diagram depicting the failure determination operation.

An example of the failure determination operation in a case where no failure has occurred at a node 101 will be described with reference to FIGS. 13 to 15. In the example depicted in FIG. 13, the node 101-5 indicated by "●" in FIG. 13 measures sensor data by the sensor. Next, the node 101-5 indicated by "●" in FIG. 13 adds to the measured sensor data, the hop count "1", the reference hop count table 700, and the identification flag "1" indicating the transmission data 800 to create the transmission data 800 and transmits the transmission data 800 within the communication area. The description transitions to FIG. 14.

In the example depicted in FIG. 14, when receiving the transmission data 800 transmitted from the node 101-5 described above, the node 101-4 that is within the communication area of the node 101-5 described above and indicated by "●" in FIG. 14, increments the hop count "1" included in the transmission data 800 to update the hop count to "2", and transmits the transmission data 800 within the communication area. In this manner, each node 101 of the node group 101s transfers the transmission data 800. The reference of the description changes to FIG. 15.

Figure 15:
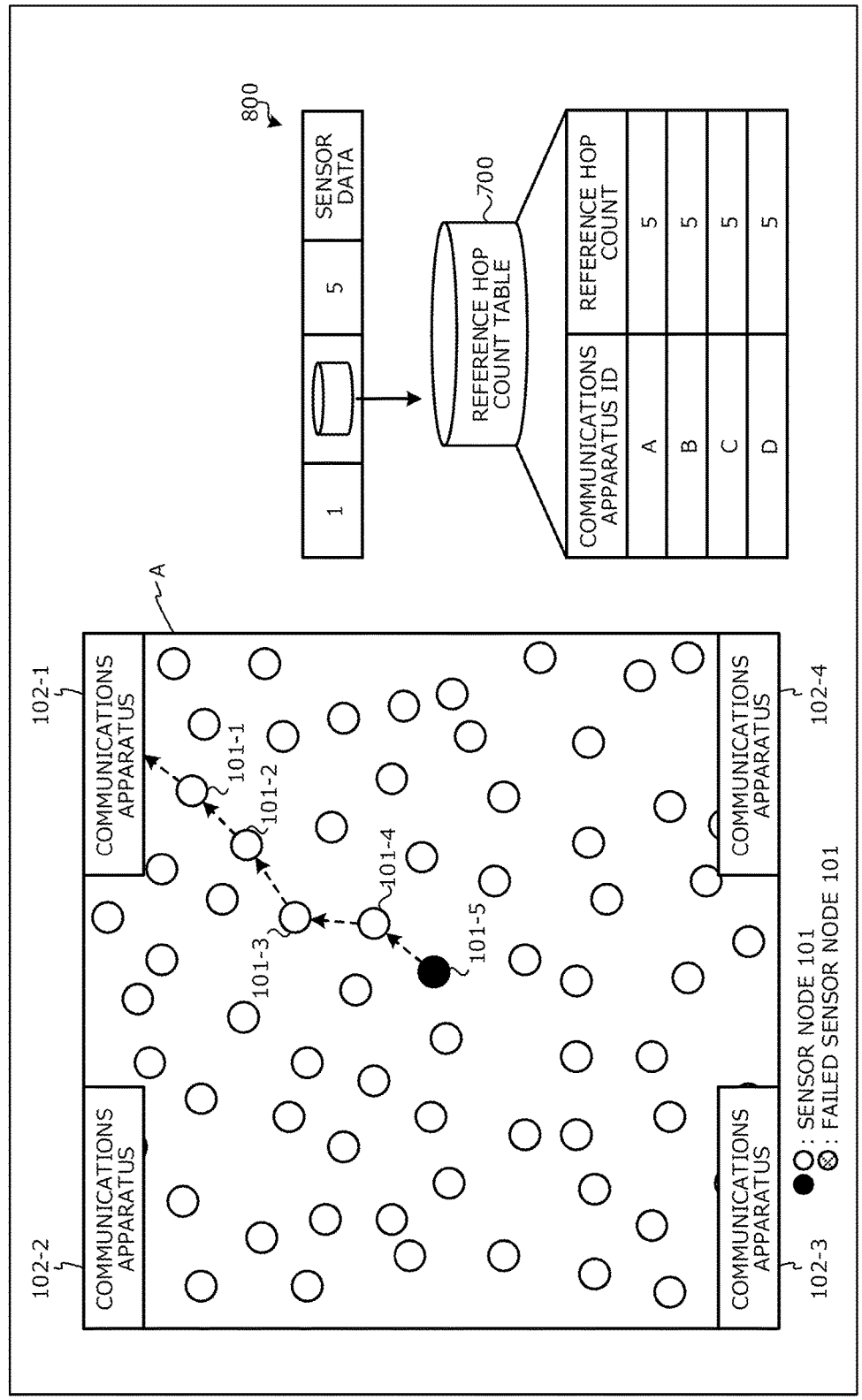
FIG. 15 is a diagram depicting the failure determination operation.

In the example depicted in FIG. 15, the communications apparatus 102-1 receives the transmission data 800 transferred by the nodes 101-1 to 101-4. The communications apparatus 102-1 compares the hop count "5" included in the transmission data 800 and the reference hop count "5" that corresponds to the communications apparatus ID "A" of the communications apparatus 102-1 included in the reference hop count table 700. Next, the communications apparatus 102-1 determines that no failure has occurred at a node 101 since the hop count "5" is not greater than the reference hop count "5" by a given value or more.

Figure 16:
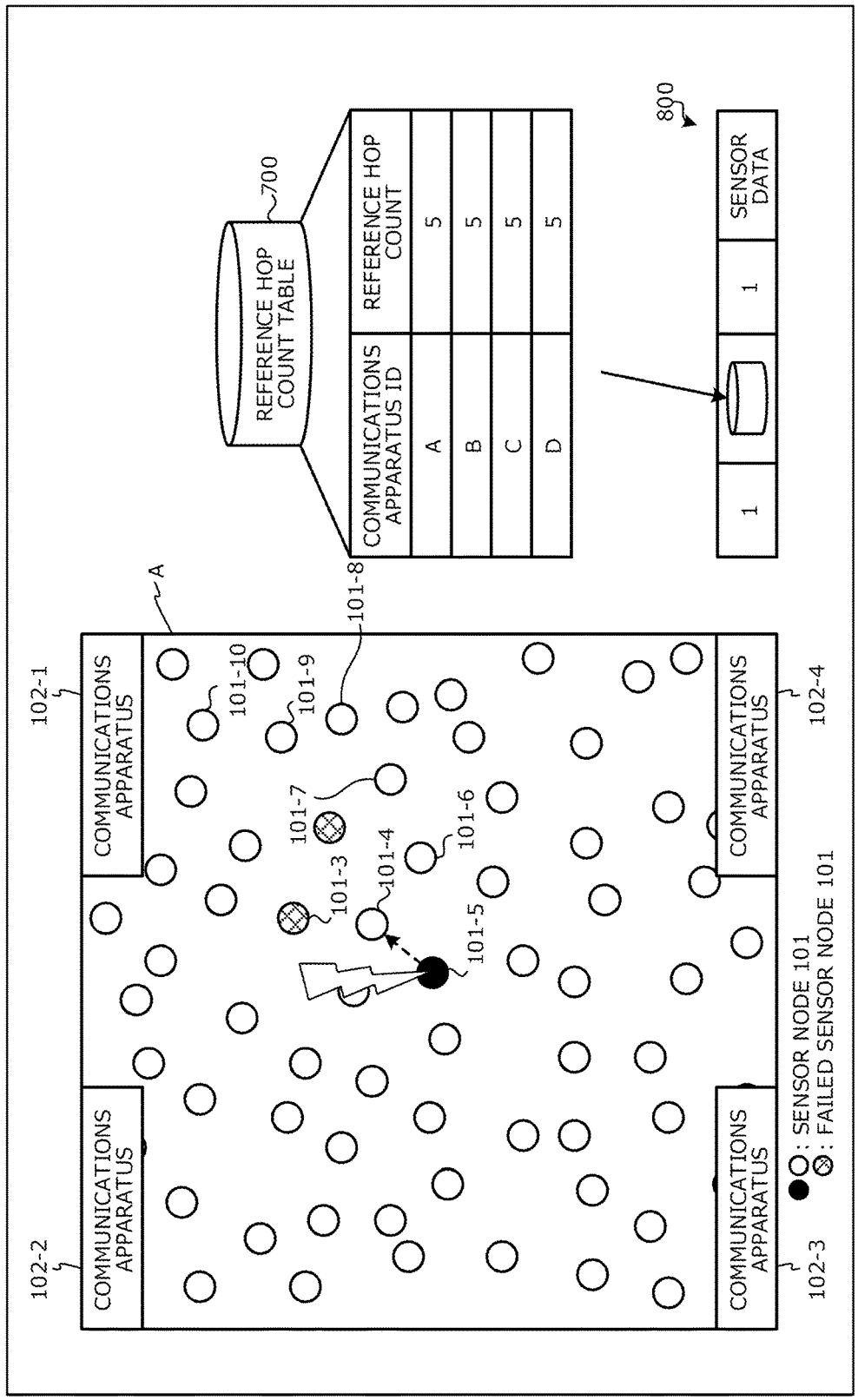
FIG. 16 is a diagram depicting the failure determination operation.

An example of the failure determination operation in a case where a failure has occurred at a node 101 will be described with reference to FIGS. 16 and 17. In the example depicted in FIG. 16, the node 101-5 indicated by "●" in FIG. 16 measures sensor data by the sensor. Next, the node 101-5 indicated by "●" in FIG. 16 adds the identification flag "1" indicating the transmission data 800, the reference hop count table 700, and the hop count "1" to the measured sensor data to create the transmission data 800, and transmits the transmission data 800 within the communication area.

In this manner, each node 101 of the node group 101s transfers the transmission data 800. Meanwhile, a failure has occurred at the node 101-3, etc. indicated by a hatched "○" in FIG. 16 and therefore, the transmission data 800 is transferred detouring the node 101-3 indicated by a hatched "○". The reference of description changes to FIG. 17.

Figure 17:
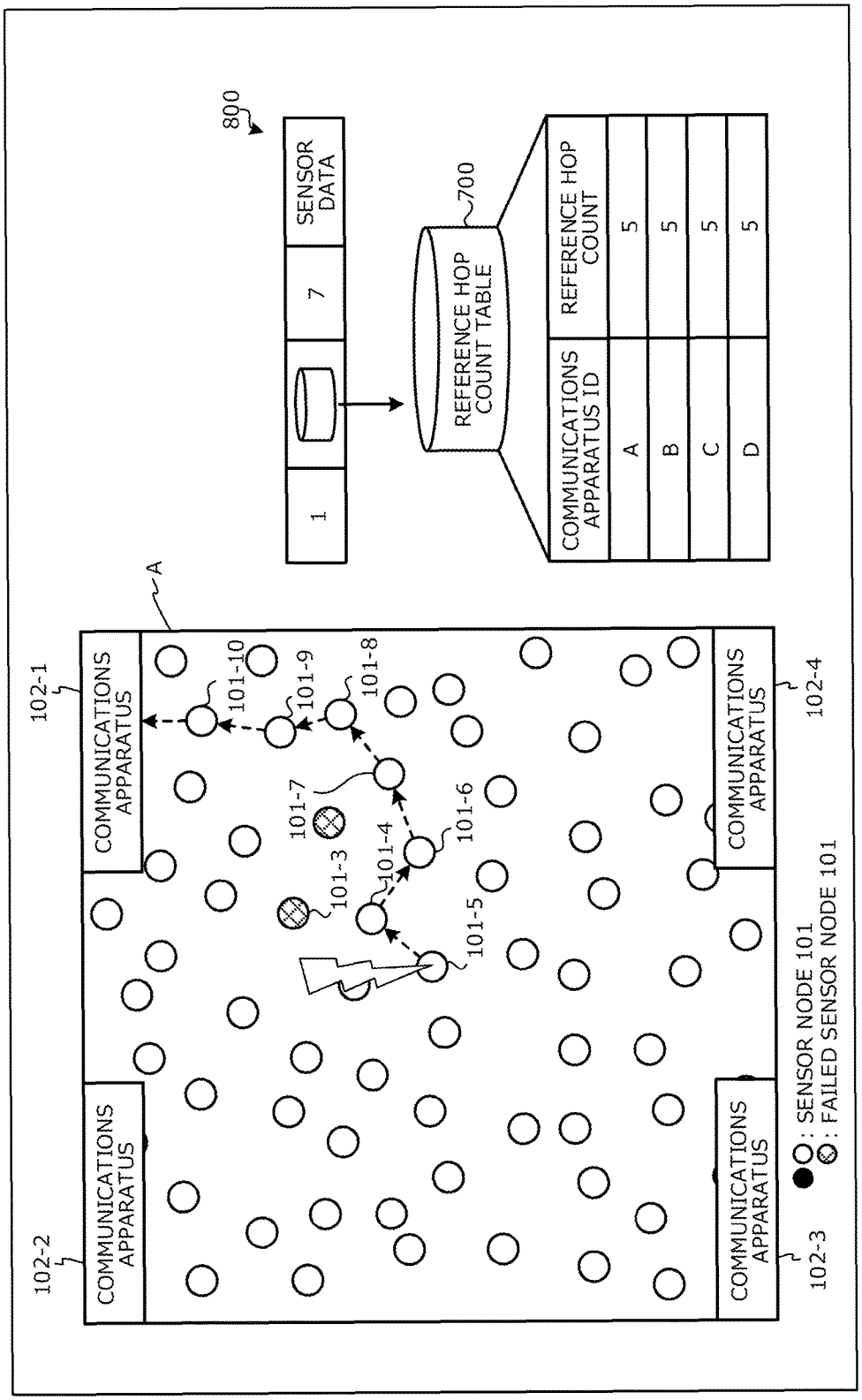
FIG. 17 is a diagram depicting the failure determination operation.

In the example depicted in FIG. 17, the communications apparatus 102-1 receives the transmission data 800. The communications apparatus 102-1 compares the hop count "7" included in the transmission data 800 and the reference hop count "5" that corresponds to the communications apparatus ID "A" of the communications apparatus 102-1 included in the reference hop count table 700. Next, the communications apparatus 102-1 determines that failure has occurred at a node 101 since the hop count "7" is greater than the reference hop count "5" by a given value.

An example of a failure range identifying operation will be described with reference to FIG. 18.

Figure 18:
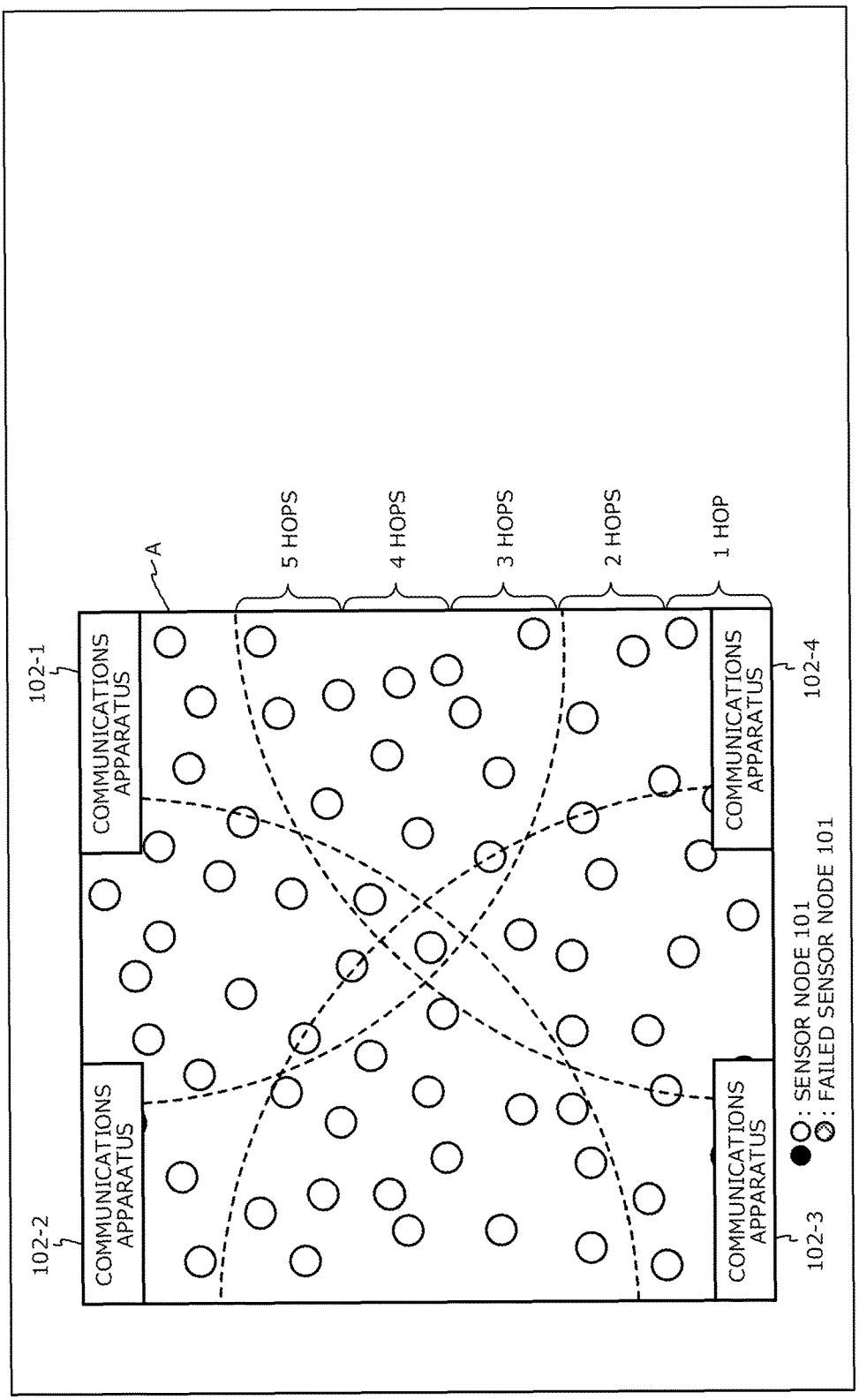
FIG. 18 is a diagram depicting an example of a failure range identifying operation.

FIG. 18 is a diagram depicting an example of the failure range identifying operation. In FIG. 18, the communications apparatus 102 identifies the range node 101 that failure occurs at the nodes 101, when a failure occurs at a node 101. In the example depicted in FIG. 18, the communications apparatus 102-1 extracts the reference hop count "5" that corresponds to the communications apparatuses 102-1 to 102-4 included in the reference hop count table 700 included in the transmission data 800.

Next, the communications apparatus 102-1 identifies the range that can be reached from the communications apparatus 102-1, by a hop count of "5" corresponding to the reference hop count that corresponds to the communications apparatus 102-1. Similarly, the communications apparatus 102-1 identifies the range that can be reached from the other communications apparatuses 102-2 to 102-4, by a hop count of "5" corresponding to the reference hop count that corresponds to the other communications apparatuses 102-2 to 102-4. The communications apparatus 102-1 identifies overlapping ranges of the ranges that can be reached by a hop count corresponding to the reference hop count from the respective communications apparatuses 102-1 to 102-4 as the range in which a node 101 that transmitted the transmission data 800 is present.

The communications apparatus 102-1 further identifies the range between the position of the communications apparatus 102-1 and the range in which a node 101 that transmitted the transmission data 800 is present to be a range in which a node 101 has failed. As a result, the communications apparatus 102 can identify and transmit to the server 201, a range in which a node 101 has failed. In the description hereinafter, a range in which a node 101 has failed may be indicated as "failure range".

An example of maintenance operation in a case where a failure range is identified will be described. The server 201, when receiving a failure range, displays the failure range on the display 306. The user of the sensor network system 200 comprehends the failure range displayed on the display 306 by the server 201 and operates the server 201 to stop operation of the nodes 101 via the communications apparatuses 102.

Next, the user of the sensor network system 200 actually goes to the failure range displayed on the display 306 by the server 201 and installs an additional node 101. The communications apparatuses 102, as depicted in FIGS. 11 and 12, transmit a registration request, and update the reference hop count tables 700 of the nodes 101. The user of the sensor network system 200 operates the server 201 to resume operation of the nodes 101 via the communications apparatuses 102. As a result, measures can be taken with respect to the sensor network system 200 without disrupting the network.

An example of threshold configuration will be described with reference to FIG. 19.

FIG. 19 is a diagram depicting an example of threshold configuration. The user of the sensor network system 200, as depicted in FIG. 19, for example, performs simulation by setting patterns of various failed node 101 counts under an assumption that the network 110 is formed by 2000 nodes 101.

The user of the sensor network system 200 determines the threshold A to be "18" based on results of the simulation. Further, the user of the sensor network system 200 determines the threshold B to be "3" based on the results of the simulation. As a result, the user of the sensor network system 200 determines that a failure is to be determined to have occurred when the difference of the hop count and the reference hop count is greater than the threshold A "18" for a number of times exceeding the threshold B "3".

An example of cooperative operation for registration of the reference hop count table 700 will be described with reference to FIG. 20.

FIG. 20 is a sequence diagram of an example of cooperative operation for registration of the reference hop count table 700. In FIG. 20, the server 201 transmits to the communications apparatus 102-1, a transmission instruction for a registration request concerning the reference hop count table 700 (step S2001). The communications apparatus 102-1, when receiving the transmission instruction, creates and transmits the control data 500 that includes the registration request for the reference hop count table 700, the communications apparatus ID of the communications apparatus 102-1, and the hop count (step S2002). The node 101-1, when receiving the control data 500, stores a record to the reference hop count table 700, updates the hop count included in the control data 500, and transfers the control data 500 (step S2003).

The server 201 transmits the transmission instruction for a registration request concerning the reference hop count table 700 to the communications apparatus 102-2, to which the transmission instruction was not transmitted (step S2004). The communications apparatus 102-2, when receiving the transmission instruction, creates and transmits the control data 500 that includes the registration request for the reference hop count table 700, the communications apparatus ID of the communications apparatus 102-2, and the hop count (step S2005). The node 101-N, when receiving the control data 500, stores a record to the reference hop count table 700, updates the hop count included in the control data 500, and transfers the control data 500 (step S2006).

When no communications apparatus 102 to which the transmission instruction has not been transmitted is present, the server 201 transmits to the communications apparatus 102-1, an execution instruction for the start of operation (step S2007). The communications apparatus 102-1, when receiving the execution instruction, transmits a request to start operation (step S2008). The node 101-1, when receiving the request to start operation, starts operation and transfers the request to start operation (step S2009). As a result, the system 100 can start operation.

An example of cooperative operation for failure determination will be described with reference to FIG. 21.

FIG. 21 is a sequence diagram of an example of cooperative operation for failure determination. In FIG. 21, the node 101-N, when measuring sensor data by the sensor, creates and transmits the transmission data 800 that includes the sensor data (step S2101). Further, node 101-1, when receiving the transmission data 800, updates the hop count included in the transmission data 800 and transmits the transmission data 800 (step S2102). The communications apparatus 102-1, when receiving the transmission data 800, performs failure determination and transmits a determination result of the failure determination to the server 201 (step S2103). As a result, the user of the sensor network system 200 can receive notification of the determination result from the server 201 and thereby, know the determination result.

An example of cooperative operation for maintenance will be described with reference to FIG. 22.

FIG. 22 is a sequence diagram of an example of cooperative operation for maintenance. In FIG. 22, the server 201 transmits an execution instruction for the suspension of operation to the communications apparatus 102-1 (step S2201). The communications apparatus 102-1, when receiving the execution instruction for the suspension of operation, transmits a request to suspend operation (step S2202). The node 101-1, when receiving the request to suspend operation, transfers the request to suspend operation (step S2203), and suspends operation. The user of the sensor network system 200 adds a node 101. As a result, the system 100 can circumvent system failure.

An example of a procedure of a transmission instruction process for a registration request concerning the reference hop count table 700 by the server 201 will be described with reference to FIG. 23.

FIG. 23 is a flowchart of one example of a procedure of the transmission instruction process by the server 201. In FIG. 23, the server 201 determines whether a user operation triggering a transmission instruction has been received (step S2301); and if not (step S2301: NO), the server 201 returns to step S2301.

On the other hand, if such user operation has been received (step S2301: YES), the server 201 determines whether a transmission instruction for a registration request concerning the reference hop count table 700 has been transmitted to all the communications apparatuses 102 (step S2302); and if not (step S2302: NO), the server 201 selects a communications apparatus 102 to which the transmission instruction has not been transmitted (step S2303). The server 201 transmits the transmission instruction to the selected the communications apparatus 102 (step S2304). The server 201 stands by for a given period (step S2305), and returns to the operation at step S2302.

On the other hand, if the transmission instruction has been transmitted to all the communications apparatuses 102 (step S2302: YES), the server 201 transmits an execution instruction for the start of operation to all the communications apparatuses 102 (step S2306), and ends the transmission instruction process. As a result, the server 201 can instruct the communications apparatuses 102 to cause the nodes to store a reference hop count.

An example of a procedure of a failure notification process by the server 201 will be described with reference to FIG. 24.

FIG. 24 is a flowchart of one example of a procedure of the failure notification process by the server 201. In FIG. 24, the server 201 determines whether data including a determination result triggering failure notification has been received (step S2401); and if not (step S2401: NO), the server 201 returns to the operation at step S2401.

On the other hand, if such data has been received (step S2401: YES), the server 201 determines whether the determination result indicates failure at a node 101 of the node group 101s (step S2402). If the determination result does not indicate the occurrence of failure (step S2402: NO), the server 201 ends the failure notification process.

On the other hand, if the determination result indicates the occurrence of failure (step S2402: YES), the server 201 identifies and outputs the failure range (step S2403). The server 201 ends the failure notification process. As a result, the server 201 can notify the user of the sensor network system 200 of the failure range.

An example of a procedure of an execution instruction process for operation suspension by the server 201 will be described with reference to FIG. 25.

FIG. 25 is a flowchart of one example of a procedure of the execution instruction process for operation suspension by the server 201. In FIG. 25, the server 201 determines whether a user operation triggering an execution instruction for the suspension of operation has been received (step S2501); and if not (step S2501: NO), the server 201 returns to the operation at step S2501.

On the other hand, if such user operation has been received (step S2501: YES), the server 201 transmits an execution instruction for the suspension of operation to all the communications apparatuses 102 (step S2502). The server 201 ends the execution instruction process for operation suspension. As a result, the server 201 can instruct the communications apparatuses 102 to cause the nodes to be in a suspended operation state.

An example of a procedure of a registration request process for the reference hop count table 700 by the communications apparatus 102 will be described with reference to FIG. 26.

FIG. 26 is a flowchart of one example of a procedure of the registration request process by the communications apparatus 102. In FIG. 26, the communications apparatus 102 determines whether a transmission instruction for a registration request has been received (step S2601); and if not (step S2601: NO), the communications apparatus 102 returns to the operation at step S2601.

On the other hand, if such transmission instruction has been received (step S2601: YES), the communications apparatus 102 adds the hop count and the communications apparatus ID of the communications apparatus 102 to the identification flag indicating a registration request and, creates and transmits the control data 500 (step S2602). The communications apparatus 102 ends the registration request process. As a result, the communications apparatus 102 can cause the nodes 101 to store a reference hop count that corresponds to the communications apparatus 102.

An example of a procedure of an operation starting process by the communications apparatus 102 will be described with reference to FIG. 27.

FIG. 27 is a flowchart of one example of a procedure of the operation starting process by the communications apparatus 102. In FIG. 27, the communications apparatus 102 determines whether an execution instruction for the start of operation has been received (step S2701); and if not (step S2701: NO), the communications apparatus 102 returns to the operation at step S2701.

On the other hand, if such an execution instruction has been received (step S2701: YES), the communications apparatus 102 transmits a request to start operation (step S2702). The communications apparatus 102 ends the operation starting process. As a result, the communications apparatus 102 can cause the nodes 101 to be in an operating state.

An example of a procedure of an operation suspending process by the communications apparatus 102 will be described with reference to FIG. 28.

FIG. 28 is a flowchart of one example of a procedure of the operation suspending process by the communications apparatus 102. In FIG. 28, the communications apparatus 102 determines whether an execution instruction for the suspension of operation has been received (step S2801); and if not (step S2801: NO), the communications apparatus 102 returns to the operation at step S2801.

On the other hand, if such execution instruction has been received (step S2801: YES), the communications apparatus 102 transmits a request to suspend operation (step S2802). The communications apparatus 102 ends the operation suspending process. As a result, the communications apparatus 102 can cause the nodes 101 to be in a suspended operation state.

An example of a procedure of a failure determination process by the communications apparatus 102 will be described with reference to FIG. 29.

FIG. 29 is a flowchart of one example of a procedure of the failure determination process by the communications apparatus 102. In FIG. 29, the communications apparatus 102 determines whether the transmission data 800 has been received from a node 101 (step S2901); and if not (step S2901: NO), the communications apparatus 102 returns to the operation at step S2901.

On the other hand, if the transmission data 800 has been received (step S2901: YES), the communications apparatus 102 obtains the hop count and the reference hop count table 700 included in the transmission data 800 (step S2902). Next, the communications apparatus 102 calculates the difference of the hop count and the reference hop count that corresponds to the communications apparatus ID of the communications apparatus 102 (step S2903).

The communications apparatus 102 determines if the difference is the threshold A or greater (step S2904). If the difference is less than the threshold A (step S2904: NO), the communications apparatus 102 transitions to the operation at step S2906. On the other hand, if the difference is the threshold A or greater (step S2904: YES), the communications apparatus 102 executes a comparison process (step S2905).

Next, the communications apparatus 102 transmits a determination result to the server 201 (step S2906), and ends the failure determination process. As a result, the communications apparatus 102 can determine whether failure of a node 101 is present in the system 100 and can transmit the determination result to the server 201 and notify the user of the sensor network system 200.

An example of a procedure of the comparison process by the communications apparatus 102 and depicted at step S2905 will be described with reference to FIG. 30.

Figure 30:
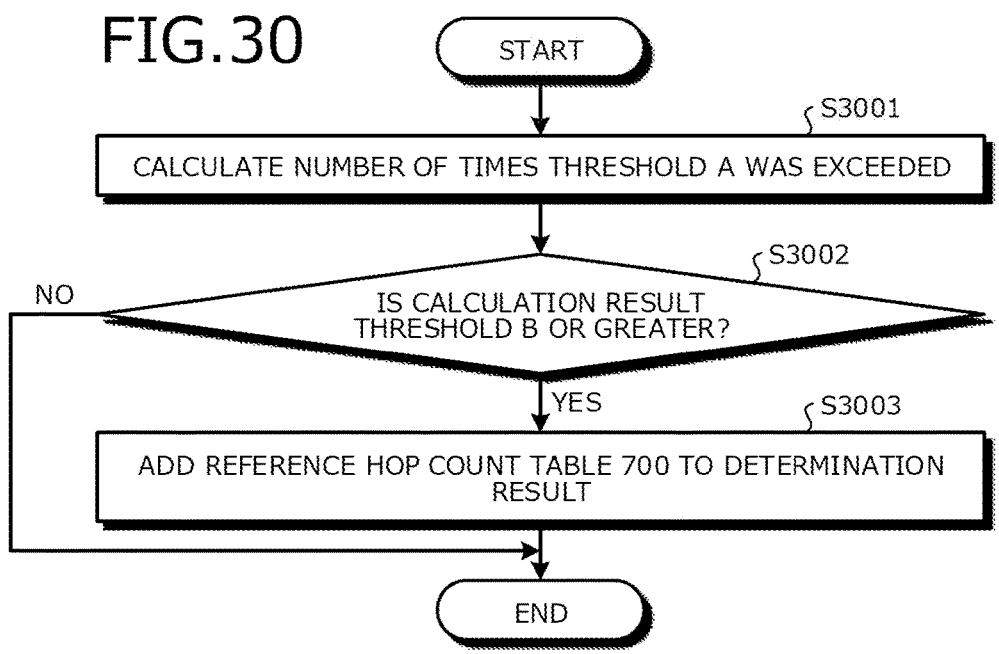
FIG. 30 is a flowchart of one example of a procedure of a comparison process by the communications apparatus 102.

FIG. 30 is a flowchart of one example of a procedure of the comparison process by the communications apparatus 102. In FIG. 30, the communications apparatus 102 calculates the number of times the threshold A was exceeded for the last 10 receptions of the transmission data 800 (step S3001). Next, the communications apparatus 102 determines if the calculation result is the threshold B or greater (step S3002). If the calculation result is less than the threshold B (step S3002: NO), the communications apparatus 102 ends the comparison process.

On the other hand, if the calculation result is the threshold B or greater (step S3002: YES), the communications apparatus 102 adds the reference hop count table 700 to the determination result (step S3003), and ends the comparison process. As a result, the communications apparatus 102 can determine whether failure of a node 101 is present in the system 100.

An example of a procedure of an operation process by the node 101 will be described with reference to FIG. 31.

Figure 31:
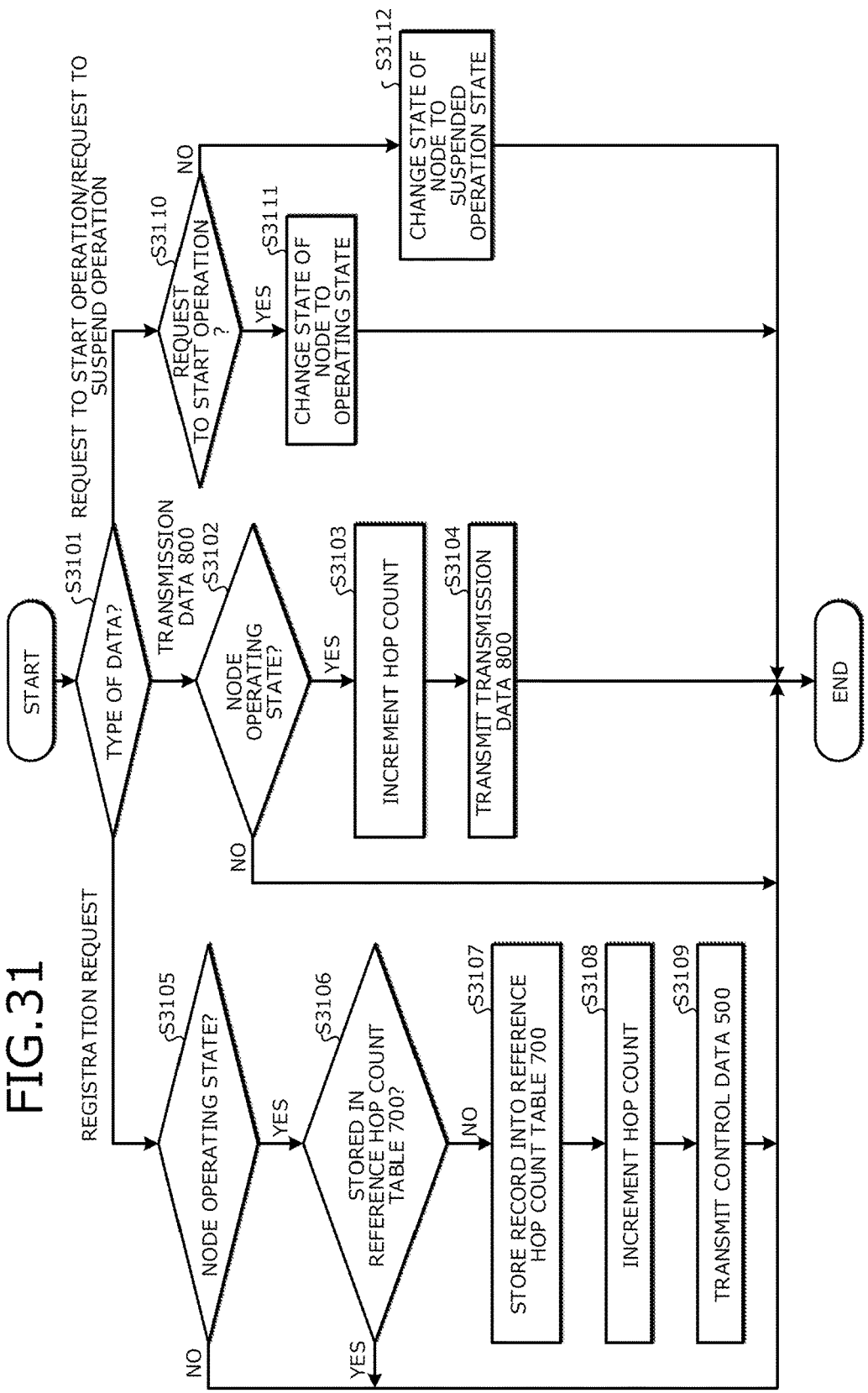
FIG. 31 is a flowchart of one example of a procedure of an operation process by the node 101.

FIG. 31 is a flowchart of one example of a procedure of the operation process by the node 101. In FIG. 31, the node 101, when receiving data, determines the type of data received (step S3101).

If the data is the transmission data 800 (step S3101: transmission data 800), the node 101 determines whether the state of the node 101 is the operating state (step S3102). If the state is not the operating state (step S3102: NO), the node 101 ends the operation process. On the other hand, if the state is the operating state (step S3102: YES), the node 101 increments the hop count included in the transmission data 800 (step S3103). Next, the node 101 transmits transmission data 800 including the incremented hop count (step S3104), and ends the operation process. As a result, the node 101 can transmit the transmission data 800.

At step S3101, if the data is the control data 500 including a registration request (step S3101: registration request), the node 101 determines whether the state of the node 101 is the operating state (step S3105). If the state is not the operating state (step S3105: NO), the node 101 ends the operation process.

On the other hand, if the state is the operating state (step S3105: YES), the node 101 extracts the communications apparatus ID included in the control data 500 and determines whether a record that includes the extracted communications apparatus ID is stored in the reference hop count table 700 (step S3106).

If such record is stored (step S3106: YES), the node 101 ends the operation process. Further, in this case, the node 101 may overwrite the reference hop count with the hop count included in the control data 500, when the hop count included in the control data 500 is less than the reference hop count associated with the communications apparatus ID in the reference hop count table 700.

On the other hand, if such record is not stored (step S3106: NO), the node 101 stores into the reference hop count table 700, a record associating the hop count and the communications apparatus ID included in the control data 500 (step S3107). Next, the node 101 increments the hop count included in the control data 500 (step S3108). The node 101 transmits the control data 500 including the incremented hop count (step S3109), and ends the operation process. As a result, the node 101 can register a reference hop count into the reference hop count table 700.

At step S3101, if the data is a request to start operation or a request to suspend operation (step S3101: request to start operation/request to suspend operation), the node 101 determines whether the data is a request to start operation (step S3110).

If the data is a request to start operation (step S3110: YES), the node 101 changes the state of the node 101 to the operating state (step S3111), and ends the operation process. On the other hand, if the data is a request to suspend operation (step S3110: NO), the node 101 changes the state of the node 101 to the suspended operation state (step S3112), and ends the operation process. As a result, the node 101 can switch between the operating state and the suspended operation state.

As described, according to the system 100 of the present embodiment, a node 101 can store based on a registration request received from the communications apparatus 102, a reference hop count to the communications apparatus 102 and can add the reference hop count when transmitting sensor data to the communications apparatus 102. As a result, the communications apparatus 102 can compare the reference hop count and the actual hop count of the sensor data, and determine whether failure at a node 101 included in the node group 101s has occurred. Further, according to the system 100 of the present embodiment, the communications apparatus 102 transmits a registration request whereby, the node 101 can store a reference hop count based on the hop count of the registration request.

Further, according to the system 100 of the present embodiment, the communications apparatus 102 associates and outputs a determination result and a reference hop count whereby, the server 201 can determine the failure range based on the reference hop count and notify the user of the sensor network system 200. Further, the user of the sensor network system 200 may identify the failure range based on the reference hop count. As a result, the user can take measures without investigating the failure range, enabling more efficient maintenance of the sensor network system 200.

According to the system 100 of the present embodiment, the communications apparatus 102 associates and outputs a determination result, a reference hop count, and the identification information of the communications apparatus 102 whereby, the server 201 can identify the failure range and notify the user, even in cases when there are plural the communications apparatuses 102. Further, the user of the sensor network system 200 may identify the failure range. As a result, the user can take measures without investigating the failure range, enabling more efficient maintenance of the sensor network system 200.

Further, according to the system 100 of the present embodiment, the communications apparatus 102 can determine that failure at a node 101 of the node group 101s has occurred when the hop count included in the transmission data 800 is greater than the reference hop count by a given value or more. As a result, configuration can be such that among the node group 101s, when a node 101 temporarily does not transfer the transmission data 800 consequent to insufficient power and the hop count increases, the communications apparatus 102 does not determine that failure has occurred.

According to the system 100 of the present embodiment, the communications apparatus 102 receives the transmission data 800 in plural and when a count of the times that the hop count included in the transmission data 800 exceeds the reference hop count by a given value or more, is a given count or more, it can be determined that failure at a node 101 of the node group 101s has occurred. As a result, configuration can be such that among the node group 101s, when a node 101 temporarily does not transfer the transmission data 800 consequent to insufficient power and the hop count increases, the communications apparatus 102 does not determine that failure has occurred.

Here, it is conceivable that a conventional communications apparatus transmits an ACK to a conventional node and the conventional node, based on the presence or absence of the ACK, determines whether there is an abnormality on a communication path. Nonetheless, in this case, in a sensor network system, there are instances where a node cannot receive an ACK even when there is no communication path abnormality and therefore, a communication path abnormality may be errantly determined. Further, in this case, application to a sensor network system designed to reduce power consumption by not having each node transmit an ACK is not possible. Further, in this case, in instances when the conventional node cannot receive an ACK, the communication path may have already been lost and the conventional node cannot notify the conventional communications apparatus of the communication path abnormality.

In contrast, the system 100 of the present embodiment can determine whether there is a communication path abnormality, without using an ACK. Further, the system 100 of the present embodiment does not use an ACK and therefore, traffic in the sensor network system 200 can be reduced, enabling the power consumed for transmitting and receiving the ACK of the nodes 101 to be saved. Further, the system 100 of the present embodiment is applicable to the sensor network system 200, which is designed to reduce power consumption by not having each node transmit an ACK. Further, in the system 100 of the present embodiment, the communications apparatus 102 can determine that there is a communication path abnormality when a detour on a communication path occurs despite the communication path not yet being lost. In other words, the user of the system 100 of the present embodiment can know of the presence of the failure of a node 101 before the system 100 fails.

Further, here, it is conceivable that a conventional node checks the hop count in a communication frame addressed to the node, and based on whether the checked hop count is the same as the maximum hop count stored in a maximum hop count storage unit, determines whether the communication frame is an abnormal communication frame. Nonetheless, in this case, the conventional node has multiple functions, increasing unit cost. In contrast, in the system 100 of the present embodiment, the node 101 suffices with fewer functions than the conventional node and thereby, enables a reduction of the unit cost.

Further, here, it is conceivable that when a conventional node has determined that there is a communication path abnormality, the conventional node notifies the conventional communications apparatus of the ID of the conventional node, and the conventional communications apparatus identifies the communication path based on the ID of the conventional node. Nonetheless, in this case, an ID is assigned to each node of a node group of several hundred to several tens of thousands of nodes and the work load prior to operation of the sensor network system increases. Further, the conventional nodes increase traffic by giving notification of the IDs thereof. Moreover, when the conventional node determines that the communication frame is abnormal, the conventional node notifies the conventional communications apparatus, increasing traffic. In contrast, in the system 100 of the present embodiment, IDs need to be assigned to the nodes 101, enabling the work load to be reduced.

The failure determining method described in the present embodiment may be implemented by executing a prepared program on a computer such as a personal computer and a workstation. The failure determining program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to one embodiment of the present invention, an effect is achieved in that it can be determined whether a failure has occurred at a node within a system.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A system having a group of nodes that perform multi-hop communication therebetween and a communications apparatus that communicates with a node included in the group of nodes, wherein the node adds to data transmitted by the node, a hop count updated each time the data is transferred by the multi-hop communication and a reference hop count for the data to be transferred from the node to the communications apparatus, and transmits the data, and the communications apparatus, when receiving the data, compares the reference hop count and the hop count added to the data, and based on a result of comparison, determines whether failure has occurred at a given node in the group of nodes, wherein the communications apparatus adds to a registration request that is for the reference hop count and that is transmitted by the communications apparatus, a hop count that is updated each time the registration request is transferred by the multi-hop communication; and the communications apparatus transmits the registration request, and the node stores to a storage apparatus as the reference hop count, the hop count added to the registration request; adds to the data, the hop count that is updated each time the data is transferred by the multi-hop communication and the reference hop count stored in the storage apparatus; and transmits the data.

2. The system according to claim 1, wherein
the communications apparatus associates and outputs a determination result and the reference hop count.

3. The system according to claim 1, wherein
the communications apparatus associates and outputs a determination result, the reference hop count, and identification information of the communications apparatus.

4. The system according to claim 1, wherein
the communications apparatus determines that failure has occurred at the given node in the group of nodes, when the hop count added to the data exceeds the reference hop count by a given value or more.

5. The system according to claim 1, wherein
the communications apparatus detects that failure has occurred at the given node in the group of nodes, when the communications apparatus receives the data in plural and the hop count added to the data exceeds the reference hop count by a given value or more, for a given number of times or more.

6. The system according to claim 1, wherein
the system has a plurality of the communications apparatuses,
the node adds to the data, the hop count that is updated each time the data is transferred by the multi-hop communication, and for each communications apparatus among the plurality of the communications apparatuses, the reference hop count for the data to be transferred from the node to the communications apparatus, and the node transmits the data, and
the communications apparatus, when receiving the data, compares the hop count added to the data and the reference hop count for the communications apparatus among the reference hop counts for the plurality of the communications apparatuses.

7. A node included among a group of nodes performing multi-hop communication therebetween, the node comprising:
a memory; and
a processor coupled to the memory and the processor configured to:
add to data that is transmitted by the node to a communications apparatus, a hop count that is updated each time the data is transferred by the multi-hop communication and a reference hop count for the data to be transferred from the node to the communications apparatus, the reference hop count being added to a registration request transmitted by the communication apparatus and being updated each time the registration request is transferred by the multi-hop communication; and
transmit the data to which the hop count and the reference hop count are added.

8. A failure determining apparatus comprising:
a memory; and
a processor coupled to the memory and the processor configured to:
compare a reference hop count that is added to data transmitted by a node included among a group of nodes performing multi-hop communication therebetween and that is for the data to be transferred from the node to a communications apparatus that communicates with the node, and a hop count that is updated each time the data is transferred by the multi-hop communication, the reference hop count being added to a registration request transmitted by the communication apparatus and being updated each time the registration request is transferred by the multi-hop communication, and
based on a comparison result, determines whether failure has occurred at a given node among the group of nodes.

9. A failure determining method of a node included among a group of nodes performing multi-hop communication therebetween, the failure determining method comprising:
adding to data that is transmitted by the node, a hop count that is updated each time the data is transferred by the multi-hop communication and a reference hop count for the data to be transferred from the node to a communications apparatus, the reference hop count being added to a registration request transmitted by the communication apparatus and being updated each time the registration request is transferred by the multi-hop communication, and transmitting the data, the node adding the hop count and the reference hop count, and transmitting the data.

10. A failure determining method comprising:
comparing by a computer, a reference hop count that is added to data transmitted by a node included among a group of nodes performing multi-hop communication therebetween and that is for the data to be transferred from the node to a communications apparatus that communicates with the node, and a hop count that is updated each time the data is transferred by the multi-hop communication, the reference hop count being added to a registration request transmitted by the communication apparatus and being updated each time the registration request is transferred by the multi-hop communication, and based on a comparison result, determining by the computer, whether failure has occurred at a given node among the group of nodes.

* * * * *